US006668660B2

(12) United States Patent
Ishihara et al.

(10) Patent No.: US 6,668,660 B2

(45) Date of Patent: Dec. 30, 2003

(54) PRESSURE SENSITIVE SENSOR AND METHOD OF TREATING TERMINAL OF PRESSURE SENSITIVE SENSOR

(75) Inventors: Hidenori Ishihara, Hamamatsu (JP); Hirokazu Tsuda, Toyohashi (JP); Manabu Kato, Hamamatsu (JP)

(73) Assignee: Asmo Co., Ltd. (JP)

( * ) Notice: Subject to any disclaimer, the term of this patent is extended or adjusted under 35 U.S.C. 154(b) by 0 days.

(21) Appl. No.: 10/315,934

(22) Filed: Dec. 11, 2002

(65) Prior Publication Data

US 2003/0106377 A1 Jun. 12, 2003

(30) Foreign Application Priority Data

Dec. 11, 2001 (JP) ....................................... 2001-377235

(51) Int. Cl.[7] .................................................. G01L 7/00

(52) U.S. Cl. ......................................................... 73/756

(58) Field of Search .......................... 73/705, 706, 714, 73/753, 756; 29/25.43, 25.35, 25.41, 407.08

(56) References Cited

U.S. PATENT DOCUMENTS

| | | | |
|---|---|---|---|
| 6,260,418 B1 | 7/2001 | Ishihara et al. | 73/756 |
| 6,349,461 B2 | 2/2002 | Ishihara et al. | 29/407.08 |
| 6,431,004 B2 | 8/2002 | Ishihara et al. | 73/719 |

*Primary Examiner*—William Oen

(74) *Attorney, Agent, or Firm*—Parkhurst & Wendel, L.L.P.

(57) ABSTRACT

According to a pressure sensitive sensor and a method of treating a terminal of a pressure sensitive sensor of the invention, a covering portion is formed by a thermoplastic resin material for hot melt molding or a photo-curing resin material cured by absorbing light energy. That is, molding pressure in molding is lower than molding pressure in molding by a general injection molding method. Therefore, a possibility of effecting adverse influence on respective connecting portions of an electrode line, a resistor, a conductive piece and a lead wire by the molding pressure is extremely low and disconnection caused by operating the molding pressure on the connecting portions can reliably be prevented.

15 Claims, 20 Drawing Sheets

PRESSURE SENSITIVE SENSOR AND METHOD OF TREATING TERMINAL OF PRESSURE SENSITIVE SENSOR

BACKGROUND OF THE INVENTION

1. Field of the Invention

The present invention relates to a pressure sensitive sensor for detecting whether external force is operated to a predetermined portion and a method of treating a terminal of a pressure sensitive sensor.

2. Description of Related Art

In a vehicle such as a wagon or a recreational vehicle, a sliding door is adopted which allows a user to slide a door panel in either a forward or rearward direction in order to open and close an ingress and egress opening. Further, there is also adopted an automatic slide door apparatus for sliding a door panel by drive force of driving means such as a motor.

Additionally, in an automatic slide door apparatus, there is a case of attaching a pressure sensitive sensor at an end portion of a door panel on a side of a sliding direction for detecting squeezing of a foreign matter when the door panel is slid in a direction of closing an ingress and egress opening. The pressure sensitive sensor is constructed by a constitution of detecting reactive press force from a foreign matter when the pressure sensitive sensor presses the foreign matter in accordance with sliding of the door panel.

As an example of a pressure sensitive sensor of this kind, there is constructed a constitution in which a plurality of pieces of electrode lines (wires) each formed in a shape of an elongated string are provided at inside of an outer skin portion in a hollow elongated shape extending in a longitudinal direction along a height direction of a door panel, the outer skin portion comprising an insulating material having a predetermined elasticity such as a rubber material or the like.

According to the pressure sensitive sensor having such a constitution, any of the plurality of pieces of electrode lines is bent in accordance with elastic deformation of the outer skin portion by reactive press force of a foreign matter to thereby bring the bent electrode line into contact with other electrode line. As a result of contact of the electrode lines in such a manner, operation of external force to the outer skin portion, that is, squeezing of the foreign matter can be detected by detecting an electric change of a current value of current flowing in an electric circuit including the pressure sensitive sensor or a resistance value of the circuit.

Meanwhile, the pressure sensitive sensor of this kind must be connected to a power source for flowing current to detecting means or the pressure sensitive sensor for detecting the change in the current value of current flowing to the electric circuit or the resistance value of the circuit. Therefore, the electrode line is electrically connected to a lead wire directly or indirectly connected to the detecting means or the power source in a state of extracting the electrode line from one end of the outer skin portion by a predetermined length.

Further, in order to ensure mechanical strength at a portion of connecting the lead wire and the electrode line and maintain electric connection at the connecting portion, for example, it is conceived to connect the lead wire and the electrode line on a support plate in a plate-like shape and mold the connecting portion and the support plate, together with an end portion of the outer skin portion, by a synthetic resin material.

Here, the above-described mold is normally formed by arranging the connecting portion, the support plate and the end portion of the outer skin portion at inside of a mold die and filling the synthetic resin material in the mold die by injection molding.

However, according to the injection molding method, injection pressure of the synthetic resin material is high and fluidity of the synthetic resin material is low even in a molten state. Therefore, when the synthetic resin material is filled in the mold die by injection molding, the synthetic resin material flowing in the mold die applies pressure on the connecting portion of the electrode line and the lead wire, as a result, there is a possibility of bringing about disconnection at the connecting portion. Further, when the molding is carried out by including also the end portion of the outer skin portion as mentioned above, there is a possibility of flowing the synthetic resin material from an opening formed at the end portion of the outer skin portion to an inner side of the outer skin portion by filling the synthetic resin material at high pressure.

SUMMARY OF THE INVENTION

It is an object of the present invention to provide a pressure sensitive sensor and a method of treating a terminal of a pressure sensitive sensor which do not bring about disconnection at portions of connecting electrodes to each other or electrodes to other conducting member such as a lead wire in forming a covering portion such as a mold, in consideration of the above-described fact.

In order to achieve the above-described object, according to a first aspect of the invention, there is provided a pressure sensitive sensor comprising a hollow outer skin portion elastically deformable by an external force from outside and having an insulating performance, a plurality of electrodes which are arranged to be opposed to each other via an air gap on an inner side of the outer skin portion and one-side ends of which are drawn out from an end portion of the outer skin portion, a support member provided on a side of the end portion of the outer skin portion for supporting the one-side ends of the plurality of electrodes drawn out from the end portion of the outer skin portion and electrically connecting the plurality of electrodes to each other or the plurality of electrodes to other conductive member, and a covering portion formed by a material including at least either one of a thermoplastic resin material molded by hot met molding and a photo-curing resin material cured by absorbing a light energy for sealing at least a portion of the support member and the one-sides of the electrodes in an embedded state.

According to the pressure sensitive sensor having the above-described constitution, when the outer skin portion is elastically deformed by operating the external force to the outer skin portion, at least one of the plurality of electrodes provided at inside of the outer skin portion is elastically deformed along with the outer skin portion.

Since the plurality of electrodes are provided via the air gap, the plurality of electrodes are normally separated from each other, however, the electrodes are conducted by deforming at least one electrode along with the outer skin portion to be proximate to and brought into contact with other electrode. By detecting such conducting of the electrodes by a change in a current value flowing in the electrodes or a change in an electric resistance value of an electric circuit constituted by including the electrodes, contact of the electrodes, that is, operation of the external force to the outer skin portion can be detected.

Meanwhile, the one-side ends of the electrodes drawn out from the end portion of the outer skin portion are supported by the support member and the electrodes are electrically connected to each other or the electrodes are electrically connected to other conducting member by the support member. When the electrodes are connected to other conducting member, for example, the electrodes are connected to power supplying means of a power source or the like or detecting means for detecting the change in the current value or the change in the electric resistance value of the electric circuit as mentioned above via the other conductive member.

Here, the support member and the one-side ends of the electrodes are sealed in the covering portion in the embedded state and therefore water or dust is prevented from adhering to portions of connecting the electrodes to each other or portions of connecting the electrodes to other conducting member supported by the support member. Further, since the support member and the one-side ends of the electrodes are embedded in the covering portion, the above-described connecting portion is supported not only by the support member but at a surrounding thereof by the covering portion, to thereby restrict deformation thereof. Thereby, disconnection of the above-described connecting portion caused by accidental external force (impact or the like) applied to the support member and a vicinity thereof is prevented.

Further, the covering portion of the pressure sensitive sensor based on the aspect is constituted by at least either one of the thermoplastic resin material molded by hot melt molding (hereinafter, referred to as “hot melt molding resin material”) and the photo-curing resin material cured by absorbing light energy.

Here, with regard to the hot melt molding resin material or the photo-curing resin material, molding pressure in molding is lower than molding pressure in molding by a general injection molding method or, in some cases, the molding pressure is not necessary. Therefore, a possibility of effecting adverse influence on respective portions of the electrodes or the support member as well as the above-described connecting portions by the molding pressure becomes extremely low and connection between the electrodes and connection between the electrodes and other conducting member at the connecting portions can reliably be maintained.

According to a second aspect of the invention, the end portion of the outer skin portion of the pressure sensitive sensor is embedded in the covering portion to seal.

According to the pressure sensitive sensor having the above-described constitution, not only the support member and the one-side ends of the electrodes but also the end portion of the outer skin portion are embedded in the covering portion to seal. Thereby, invasion of water or invasion of dust or the like from the end portion of the outer skin portion is prevented.

Here, as described above, according to the hot melt molding resin material or the photo-curing resin material, the molding pressure is low or the molding pressure per se is not necessary and therefore, in molding the covering portion, flowing of the synthetic resin material from the end portion of the outer skin portion is prevented or alleviated. Thereby, it can be prevented to accidentally or unpreparedly flow a large amount of the synthetic resin material to the outer skin portion in forming the covering portion and nondetection of external force caused by such flowing of the synthetic resin material to cure can be prevented.

According to a third aspect of the invention, the covering portion of the pressure sensitive sensor includes an inner layer formed by the thermoplastic resin material molded by the hot melt molding or the photo-curing resin material for sealing at least a portion of the support member and the one-side ends of the electrodes in the embedded state, and an outer layer formed by the thermoplastic resin material molded by the hot melt molding or the photo-curing resin material integrally with the inner layer for covering at least a portion of the inner layer from an outer side and having a rigidity higher than a rigidity of the inner layer in a cured state.

According to the pressure sensitive sensor having the above-described constitution, at least a portion of the support member and one-side ends of the electrodes are sealed in the inner layer in the embedded state by the inner layer constituting the covering portion, further, at least a portion of the inner layer is covered by the outer layer integrally provided with the inner layer on the outer side.

Here, the inner layer and the outer layer are formed by the hot melt molding resin material or the hot-curing resin material. However, the rigidity of the synthetic resin material forming the outer layer in the cured state is higher than the rigidity of the synthetic resin material forming the inner layer in the cured state.

The outer layer having the rigidity higher than that of the inner layer ensures strength against unprepared external force (for example, impact) and maintains its shape against such an external force (that is, deformation of the outer layer by external force is smaller than that of the inner layer). Thereby, disconnection of portions of connecting the electrodes to each other or portions of connecting the electrodes to other conducting member caused by deforming the covering portion by unprepared external force can be prevented over a long period of time.

Meanwhile, the inner layer having the rigidity lower than that of the outer layer (in other words, having high elasticity) holds the portions of connecting the electrodes to each other or the portions of connecting the electrodes to other conducting member in the support portion comparatively flexibly. Further, when the above-described unprepared external force is assumedly exerted to the outer layer, external force transmitted to the inner layer via the outer layer is absorbed by the inner layer by elasticity of its own. Also thereby, disconnection of portions of connecting the electrodes to each other or the portions of connecting the electrodes to other conducting member caused by deformation at the covering portion by unprepared external force can be prevented over a long period of time.

Further, as combinations of synthetic resin materials for forming respectives of the inner layer and the outer layer, there can be four kinds of a constitution: a constitution of forming the inner layer by the hot melt molding resin material and forming the outer layer by the photo-curing resin material; a constitution of forming the inner layer by the photo-curing resin material and forming the outer layer by the hot melt molding resin material; a constitution of forming the inner layer and the outer layer by the hot melt molding resin material; and a constitution of forming the inner layer and the outer layer by the photo-curing resin material. However, the combination may be any of the four kinds of constitutions.

According to a fourth aspect of the invention, the covering portion of the pressure sensitive sensor is made transparent or semitransparent.

According to the pressure sensitive sensor having the above-described constitution, the covering portion is transparent or semitransparent and therefore, connection of the electrodes and connection of the electrodes to other conducting member can be confirmed without detaching the covering portion or destructing the covering portion. Thereby, acceptability determination in an inspecting step after forming the covering portion or in maintenance is facilitated and operational efficiency is promoted.

According to a fifth aspect of the invention, the covering portion includes an engaging portion provided integrally therewith and the covering portion and the outer skin portion are integrally held via the engaging portion.

According to the pressure sensitive sensor having the above-described constitution, by directly or indirectly engaging the engaging portion integrally provided with the covering portion to the outer skin portion at a predetermined attached portion, the covering portion can be held at the attached portion via the engaging portion. Thereby, at least a portion of the pressure sensitive sensor can be fixed at the attached portion and therefore, external force at the attached portion can be detected.

According to the pressure sensitive sensor, as described above, at least the covering portion is firmly held at the attached portion. Therefore, even when vibration or the like is brought about at the outer skin portion, vibration or the like at the covering portion is alleviated or prevented. Thereby, disconnection of connection between the electrodes and connection between the electrodes to other conducting member in the covering portion caused by vibration or the like can be prevented.

According to a sixth aspect of the invention, the engaging portion of the pressure sensitive sensor is formed by a material the same as a material of the covering portion.

According to the pressure sensitive sensor having the above-described constitution, the engaging portion engaged directly or indirectly with the attached portion and held at the attached portion is formed by a material the same as that of the covering portion, that is, the photo-curing resin or the hot melt molding resin material. Therefore, by forming the covering portion, the engaging portion is formed along with the covering portion. Thereby, a member of separately constituting the engaging portion is not necessary. As a result, a reduction in a number of parts and a reduction in integrating steps can be achieved, which significantly contributes to a reduction in cost.

According to a seventh aspect of the invention, there is provided a method of treating a terminal of a pressure sensitive sensor for treating the one-side ends of the plurality of electrodes drawn out from the end portion of the outer skin portion when the pressure-sensitive sensor according to the first aspect is produced, the method comprising (a) a connecting step of making the support member support the one-side ends of the plurality of electrodes and electrically connecting the electrodes to each other or the electrodes to other conductive member, (b) an inner layer molding step of forming an inner layer constituting the covering portion by arranging at least a portion of the support member and the one-side ends of the electrodes in an inner layer molding die and filling a photo-curing resin material cured by absorbing a light energy or a thermoplastic resin material molded by hot melt molding in the inner layer molding die so that at least the portion of the support member and the one-side ends of the electrodes are embedded in the inner layer to seal, and (c) an outer layer molding step of forming an outer layer constituting the covering portion by arranging at least a portion of the inner layer in an outer layer molding die and filling a photo-curing resin material cured by a rigidity higher than a rigidity of the inner layer by absorbing the light energy, or a thermoplastic resin material molded by the hot melt molding and having a rigidity higher than the rigidity of the inner layer in a cured state, in the outer layer molding die, so that at least the portion of the inner layer is covered by the outer layer.

According to the method of treating the terminal of the pressure sensitive sensor having the above-described constitution, first, in the connecting step, the one-side ends of the plurality of electrodes drawn out from the end portion of the outer skin portion are supported by the support member and the electrodes are electrically connected to each other or the electrodes are electrically connected to other conducting member.

Successively, in the inner layer molding step, at least the portion of the support member and the one-side ends of the electrodes are arranged in the inner layer molding die and under the state, the thermoplastic resin material molded by hot melt molding (hereinafter, simply referred to as "hot melt molding resin material") or the photo-curing resin material cured by absorbing light energy is filled in the inner layer molding die.

Under the state, the inner layer constituting the covering portion is formed by curing the synthetic resin material (hot melt molding resin material or photo-curing resin material) filled in the inner layer molding die and at least the portion of the support member and the one-side ends of the electrodes as well as the portions of connecting the electrodes to each other or the portions of connecting the electrodes to other conducting member are sealed in the inner layer in the embedded state.

Here, in comparison with the case of molding the inner layer by a general injection molding method, in the present method of utilizing the hot melt molding resin material or the photo-curing resin material, molding pressure in molding is low or molding pressure per se is not necessary. Therefore, the hot melt molding resin material or the photo-curing resin material filled in the inner layer molding die does not press the support member or the electrodes by large force. Thereby, the support member and the electrodes are reliably disposed at previously set predetermined positions in the inner layer.

Further, since as described above, the hot melt molding resin material or the photo-curing resin material does not press the support member or the electrodes by large force, the photo-curing resin material does not disconnect the portions of connecting the electrodes to each other and the portions of connecting the electrodes to other conducting member and thus connection at the above-described connecting portions can firmly be maintained.

Furthermore, in comparison with a case of molding by a general injection molding method, the hot melt molding resin material or the photo-curing resin material is cured in a short period of time. Therefore, by using the hot melt molding resin material or the photo-curing resin material, the inner layer is formed in a short period of time and a number of operating steps can significantly be reduced.

Next, when the inner layer has been formed as described above, in the outer layer molding step, at least a portion of the previously formed inner layer is arranged in the outer layer molding die. Under the state, the hot melt molding resin material or the photo-curing resin material is filled in the outer layer molding die. By curing the hot melt molding resin material or the photo-curing resin material filled in the outer layer molding die, a portion of the inner layer arranged in the outer layer molding die is covered by the outer layer.

As described above, in the hot melt molding resin material or the photo-curing resin material, molding pressure in molding is low or molding pressure per se is not necessary and therefore, the outer layer is formed in a short period of time and a number of operating steps can significantly be reduced.

Meanwhile, according to the invention, the rigidity after curing of the synthetic resin material (that is, hot melt molding resin material or photo-curing resin material) for forming the outer layer is larger than that of the synthetic resin material (that is, hot melt molding resin material or photo-curing rein material) for forming the inner layer.

Therefore, the outer layer ensures strength against unprepared external force (for example, impact) and maintains its shape against such an external force (that is, deformation of the outer layer by external force is smaller than that of the inner layer). Thereby, disconnection of portions of connecting the electrodes to each other or portions of connecting the electrodes to other conducting member caused by deformation at the covering portion by unprepared external force can be prevented over a long period of time.

Meanwhile, the inner layer having the rigidity lower than that of the outer layer (in other words, having high elasticity) holds the portions of connecting the electrodes to each other or the portions of connecting the electrodes to other conducting member in the support member comparatively flexibly. Further, when the above-described unprepared external force is assumedly exerted to the outer layer, external force transmitted to the inner layer via the outer layer is absorbed by the inner layer by elasticity of its own. Also thereby, disconnection of the portions of connecting the electrodes to each other or the portions of connecting the electrodes to other conducting member caused by deformation at the covering portion by unprepared external force can be prevented over a long period of time.

Further, as combinations of synthetic resin materials for forming respectives of the inner layer and the outer layer, there can be four kinds of a constitution: a constitution of forming the inner layer by the hot melt molding resin material and forming the outer layer by the photo-curing resin material; a constitution of forming the inner layer by the photo-curing resin material and forming the outer layer by the hot melt molding resin material; a constitution of forming the inner layer and the outer layer by the hot melt molding resin material; and a constitution of forming the inner layer and the outer layer by the photo-curing resin material. However, the combination may be any of the four kinds of constitutions.

According to an eighth aspect of the invention, the (b) inner layer molding step further includes a step of arranging the end portion of the outer skin portion in the inner layer molding die.

According to the aspect, in the inner layer molding step of the method of treating the terminal of the pressure sensitive sensor, the end portion of the outer skin portion is arranged in the inner layer molding die. Therefore, the end portion of the outer skin portion is embedded in the inner layer.

Thereby, invasion of water or invasion of dust or the like from the end portion of the outer skin portion can be prevented.

Here, as described above, in molding the hot melt molding resin material or the photo-curing resin material constituting the inner layer, molding pressure is lower than that of a general injection molding method or molding pressure per se is not necessary and therefore, when the hot melt molding resin material or the photo-curing resin material is filled in the inner layer molding die, flowing of the synthetic resin material (hot melt molding resin material or photo-curing resin material) from the end portion of the outer skin portion can be prevented or alleviated. Thereby, nondetection of external force by the pressure sensitive sensor caused by such flowing of a large amount of the synthetic resin material to cure can be prevented.

According to a ninth aspect of the invention, at least either one of the (c) outer layer molding step and the (b) inner layer moldering step, further includes (d) a step of forming an engaging portion integral with the covering portion, and (e) a step of holding the covering portion and the outer skin portion in air tight and integrally via the engaging portion.

According to the aspect, in either one of the outer layer molding step and the inner layer molding step, when the synthetic resin material in correspondence with the step is filled to the corresponding molding die, the engaging portion is formed along with the covering portion constituted by the inner layer and the outer layer. When the pressure sensitive sensor is attached to a predetermined attached portion, by engaging the engaging portion to the attached portion, the covering portion is held at the attached portion via the engaging portion.

That is, also the engaging portion is formed simultaneously with the covering portion and therefore, a member or a step of particularly constituting the engaging portion is dispensed with. Thereby, cost can be reduced considerably.

DETAILED DESCRIPTION OF THE EMBODIMENTS

<Constitution of First Embodiment>

(Basic constitution of pressure sensitive sensor 12)

Figure 1:
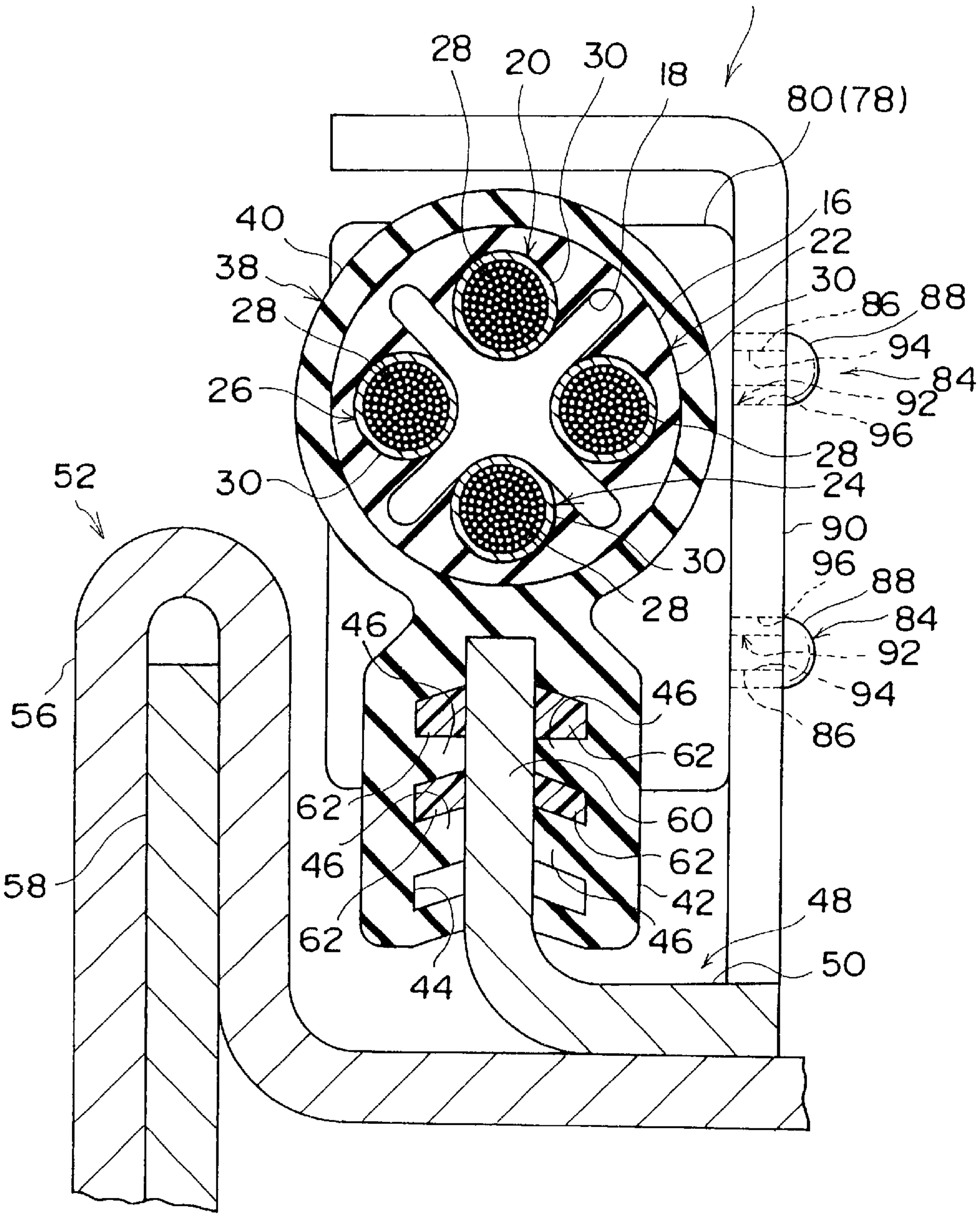
FIG. 1 is a horizontal sectional view of a pressure sensitive sensor according to a first embodiment of the present invention.

FIG. 1 shows a constitution of a pressure sensitive sensor 12 applied as a squeezing detecting apparatus 10 constituting a pressure detecting apparatus according to a first embodiment of the present invention by a sectional view.

As shown by FIG. 1, the pressure sensitive sensor 12 is provided with an outer skin portion 16 molded in an elongated shape and made of an insulating rubber material such as silicone rubber, ethylene-propylene rubber, styrene-butadiene rubber, or chloroprene rubber, or an insulating elastic material of polyethylene, ethylene vinyl acetate copolymer, ethylene ethylacrylate copolymer, ethylene methylmethacrylate copolymer, polyvinyl chloride, or thermoplastic elastomers of olefin species or styrene species.

Figure 13:
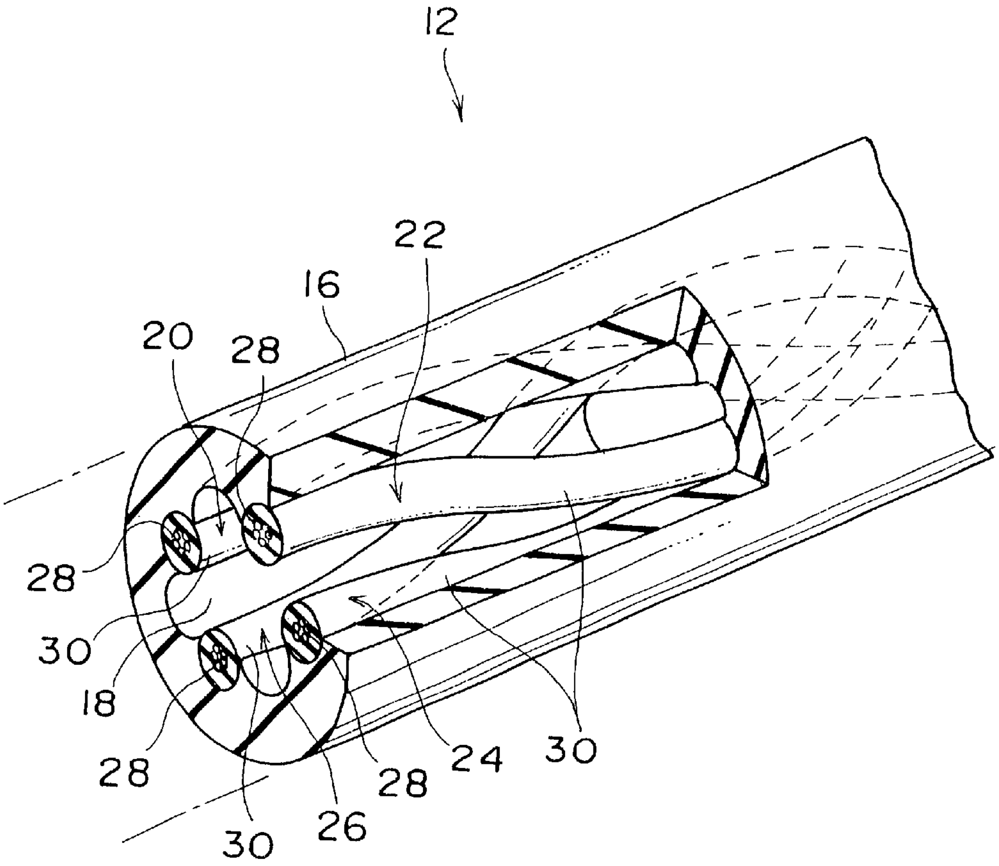
FIG. 13 is a perspective view of an outer skin portion.

As shown by FIG. 1 and FIG. 13, a cross hole 18 having a section in a cross-like shape is formed at inside of the outer skin portion 16. The cross hole 18 is made continuous along a longitudinal direction of the outer skin portion 16 and successively displaced around a center of the outer skin portion 16 along the longitudinal direction as shown by FIG. 13. Further, a plurality of pieces of electrode lines 20, 22, 24, and 26 are provided as electrodes at inside of the outer skin portion 16.

Each of the electrode lines 20 through 26 is provided with a plurality of (a number of) filaments 28 formed by conductive extremely slender wires. The filaments 28 are formed into a shape of an elongated string having a flexibility as a whole by being twisted. Further, the filaments 28 are contained in (covered by) a tube 30 in a shape of an elongated cylinder and having a conductivity, to be summarized integrally.

Further, although according to the embodiment, the electrode lines 20 through 26 are constructed by a constitution of using so-to-speak "covered line" in which the twisted filaments 28 are covered by the tube 30, the electrode lines 20 through 26 are not limited to the mode but, for example, so-to-speak "bare line" constituted by only twisting the filaments 28 may be used.

The electrode lines 20 through 26 are separated from each other by interposing the cross hole 18 at a vicinity of the center of the cross hole 18 and spirally arranged along the cross hole 18 and fixedly attached integrally to an inner peripheral portion of the cross hole 18. Therefore, the electrode lines 20 through 26 are bent by elastically deforming the cross hole 18. When the outer skin portion 16 is elastically deformed to a degree of crushing the cross hole 18, particularly, any or all of the electrode lines 20 through 26 are brought into contact with each other and conducted. Further, when the cross hole 18 is recovered to an original shape, the electrode lines 20 through 26 are also recovered in accordance therewith.

Figure 15:
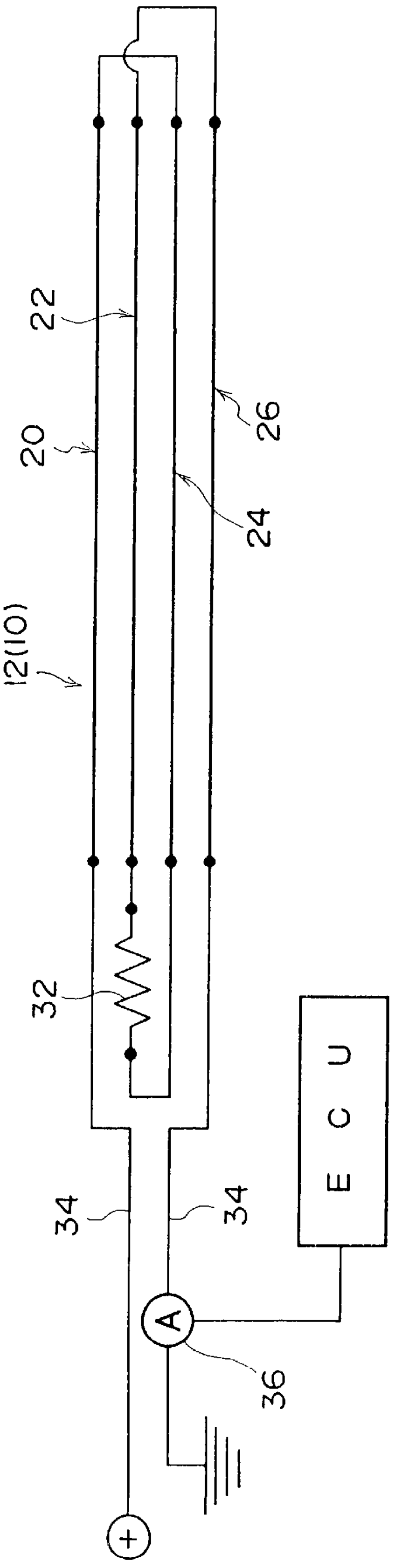
FIG. 15 is a view showing an outline of a circuit constitution of the pressure sensitive sensor.

As shown by a circuit diagram of FIG. 15, one end portion in a longitudinal direction of the electrode line 22 is connected to one end of a resistor 32 having predetermined electric resistance and other end of the resistor 32 is connected with one end portion in a longitudinal direction of the electrode line 24. Meanwhile, other end portion in the longitudinal direction of the electrode line 22 is connected to other end portion in a longitudinal direction of the electrode line 26 and other end portion in a longitudinal direction of the electrode line 24 is connected to other end portion in a longitudinal direction of the electrode line 20. That is, the electrode line 20 is connected in series with the electrode line 26 via the electrode line 24, the resistor 32 and the electrode line 22.

Further, respective one end portions in the longitudinal directions of the electrode lines 20 and 26 are connected to power sources via lead wires 34. However, only the electrode line 26 is connected to the power source via a current detecting element 36 for transmitting an electric detecting signal when current equal to or larger than a predetermined value flows in the circuit.

(Constitution of protector 38)

Meanwhile, as shown by FIG. 1, the squeezing detecting apparatus 10 is provided with a protector 38. The protector 38 is provided with a cylindrical portion 40 having a section substantially in a shape of a circular cylinder formed by rubber or a synthetic resin material having an elasticity substantially equal to that of rubber.

An inner diameter dimension of the cylindrical portion 40 is formed to be substantially equal to an outer diameter dimension of the outer skin portion 16 and the outer skin portion 16 is covered by the cylindrical portion 40 by inserting the outer skin portion 16 from one end of the cylindrical portion 40. Further, the protector 38 is provided with an attaching portion 42.

The attaching portion 42 is formed continuously from the cylindrical portion 40 and a section thereof is formed substantially in a rectangular shape at least on a side thereof opposed to the cylindrical portion 40. On the side of the attaching portion 42 opposed to the cylindrical portion 40, a groove portion 44 is formed continuously along a longitudinal direction of the cylindrical portion 40 and the attaching portion 42 (that is, longitudinal direction of the protector 38). Interference pieces 46 are respectively formed to project from inner walls of inner sides of the groove portions 44 opposed to each other and a bracket 48 is brought between the interference pieces 46.

(Constitution of Bracket 48)

Figure 14:
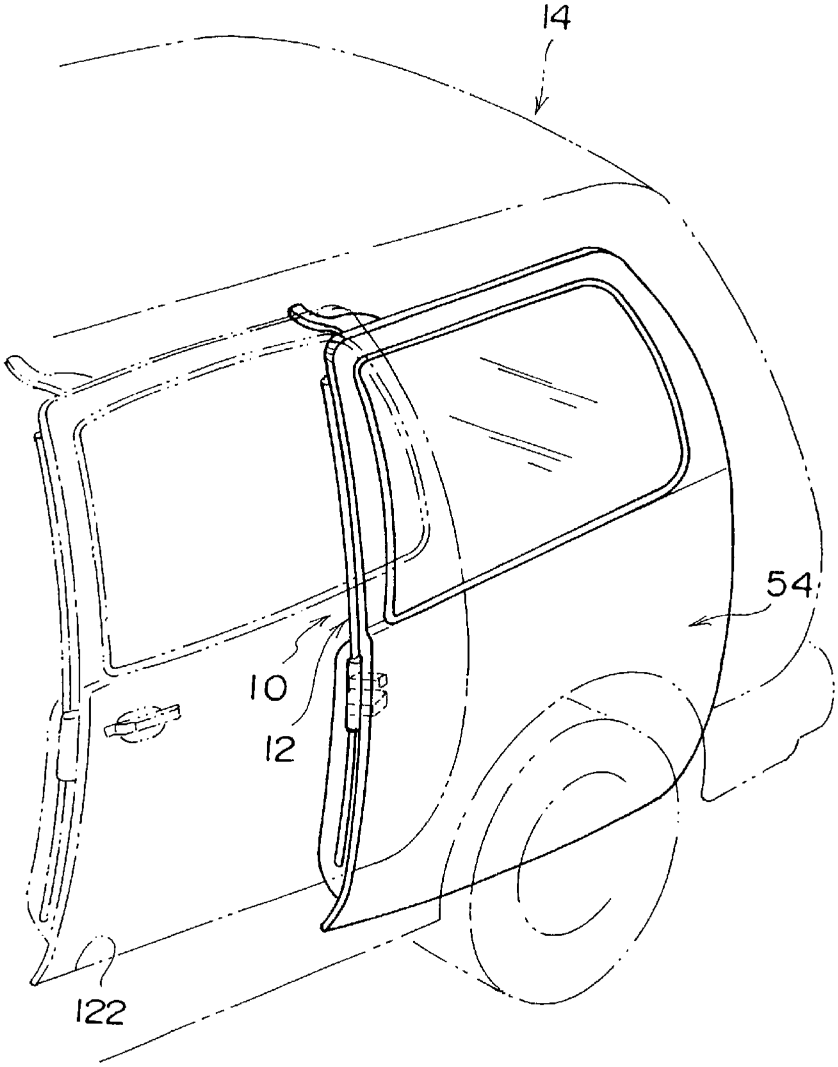
FIG. 14 is a perspective view of a vehicle to which the pressure sensitive sensor is applied.

The bracket 48 is provided with an attaching portion 50 in a plate-like shape. The attaching portion 50 is attached to a front end portion of a door panel 54 of an automatic slide door apparatus 52 of a vehicle 14 (refer to FIG. 14).

In details, as shown by FIG. 1, an outer panel 56 constituting the door panel 54 is folded back to wrap on an inner panel 58 at a vicinity of a front end portion of the inner panel 58 and is folded to an inner side of a vehicle compartment and the attaching portion 50 is attached to a portion at which the outer panel 56 is folded to bend to the inner side of the vehicle compartment.

A fit-in plate 60 is extended from one end portion in a width direction of the attaching portion 50 substantially to a front side of the vehicle and the fit-in plate 60 is brought into the groove portion 44 of the protector 38. As mentioned above, at the fit-in plate 60 brought into the groove portion 44, an adhering agent 62 previously filled in the groove portion 44 is solidified in a state of being fixedly attached to the fit-in plate 60 and when the fit-in plate 60 is intended to draw out from the groove portion 44, the interference piece 46 interferes with the adhering agent 62 which is solidified and integrated with the fit-in plate 60. Thereby, the fit-in plate 60 is prevented from being drawn from the groove portion 44.

(Constitution of Support Member 64)

Figure 2:
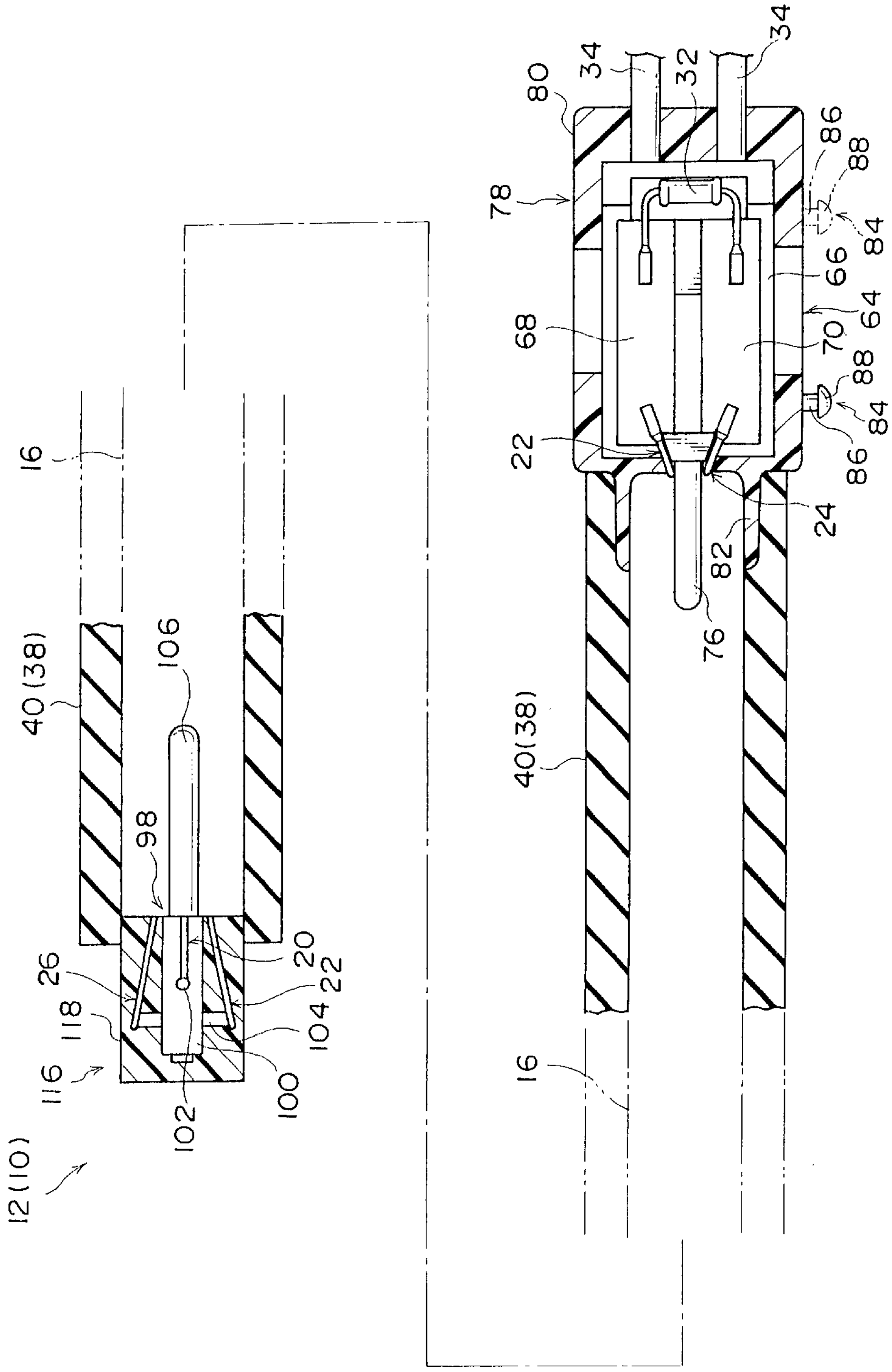
FIG. 2 is a vertical sectional view showing an outline of a structure of the pressure sensitive sensor according to the first embodiment of the invention.
Figure 3:
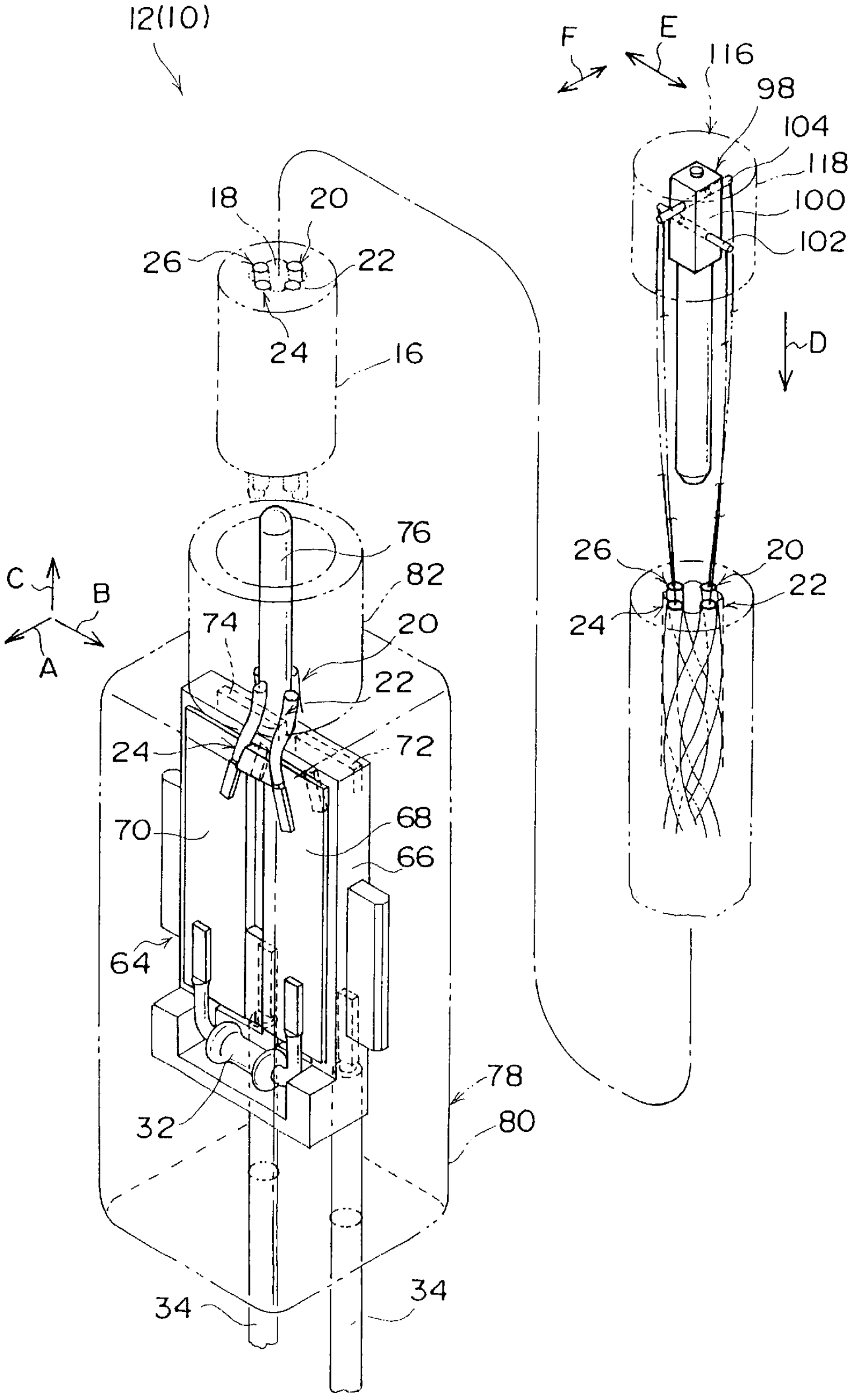
FIG. 3 is a perspective view showing an outline of a structure of vicinities of both end portions of the pressure sensitive sensor according to the first embodiment of the invention.
Figure 4:
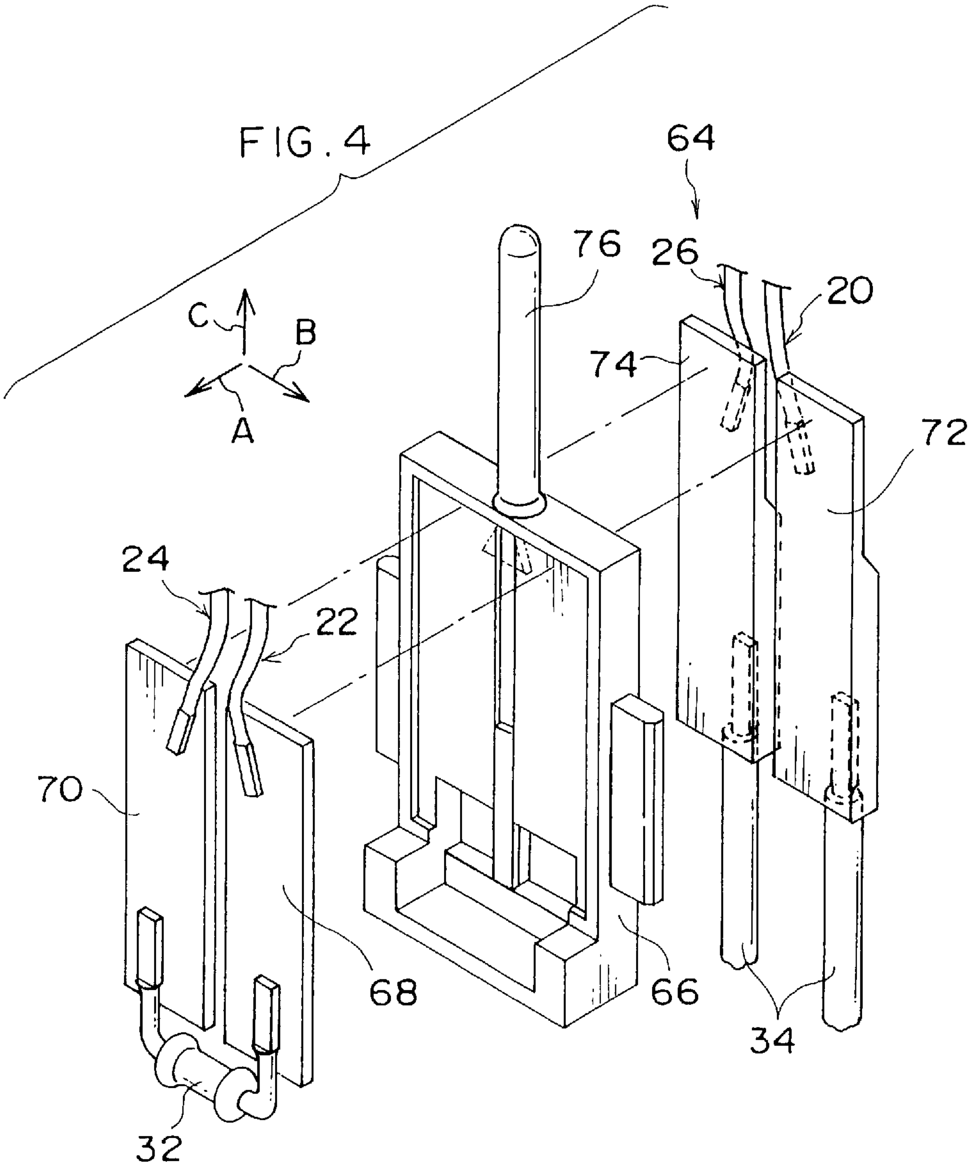
FIG. 4 is a disassembled perspective view of one support member.

Meanwhile, as shown by FIG. 2 and FIG. 3, a support member 64 is provided at one end in the longitudinal direction of the outer skin portion 16 (end portion of the outer skin portion 16 at one-end sides in the longitudinal directions of the electrode lines 20 through 26). Here, FIG. 4 shows a constitution of the support member 64 by a disassembled perspective view. As shown by FIG. 4, the support member 64 is provided with a base 66 formed substantially in a plate-like shape by an insulating material of a synthetic resin material or the like. The base 66 is constituted by substantially a rectangular shape in plane view and on one face in a thickness direction thereof (arrow mark A direction of FIG. 4), a pair of conductive pieces 68 and 70 are integrally molded with the base 66 by a molding method of insert molding or the like. The respective conductive pieces 68 and 70 are metal pieces substantially in a rectangular shape in plane view and arranged in parallel in a state of being separated from each other along a width direction thereof (arrow mark B direction of FIG. 4).

The conductive piece 68 is fixedly attached integrally with an end portion of the electrode line 22 extended from the end portion of the outer skin portion 16 by welding or the like to thereby electrically connect the conductive piece 68 and the electrode line 22. Meanwhile, the conductive piece 70 is integrally attached fixedly with an end portion of the electrode line 24 extended from the end portion of the outer skin portion 16 by welding or the like to thereby electrically connect the conductive piece 70 and the electrode line 24.

Further, the above-described resistor 32 is arranged on the base 66 on a side thereof opposed to the electrode lines 22 and 24 via the conductive pieces 68 and 70. One lead wire extended from the resistor 32 is integrally attached fixedly to the conductive piece 68 by welding or the like to thereby electrically connect the resistor 32 and the electrode line 22 via the conductive piece 68. In contrast thereto, other lead wire extended from the resistor 32 is integrally attached fixedly with the conductive piece 70 by welding or the like to thereby electrically connect the resistor 32 and the electrode line 24 via other conductive piece 68.

Meanwhile, at other face of the base 66 in the thickness direction (direction opposed to the arrow mark A of FIG. 4), a pair of conductive pieces 72 and 74 are integrally molded with the base 66 by a molding method of insert molding or the like. The respective conductive pieces 72 and 74 are metal pieces substantially in a rectangular shape in plane view and arranged in parallel in a state of being separated from each other along a width direction thereof.

The conductive piece 72 is integrally attached fixedly with an end portion of the electrode line 20 extended from the end portion of the outer skin portion 16 by welding or the like to thereby electrically connect the conductive piece 72 and the electrode line 20. Meanwhile, the conductive piece 74 is integrally attached fixedly with an end portion of the electrode line 26 extended from the end portion of the outer skin portion 16 by welding or the like to thereby electrically connect the conductive piece 74 and the electrode line 26.

Further, respectives of the conductive pieces 72 and 74 are integrally attached fixedly with the lead wires 34 as conductive members respectively by welding or the like. One of the lead wires 34 and the electrode line 20 are electrically connected via the conductive piece 72. In contrast thereto, other of the lead wires 34 is integrally attached fixedly to the conductive piece 74 by welding or the like. That is, other of the lead wires 34 and the electrode line 26 are electrically connected via other conductive piece 74.

Further, a shaft 76 in a shape of a round bar is formed as a fit to insert portion at one end portion in the longitudinal direction of the base 66. The shaft 76 is integrally formed with the base 66, a base end portion thereof is connected to the base 66 substantially at center in the width direction (arrow mark B direction of FIG. 4) at one end portion in the longitudinal direction of the base 66 (end portion on a side of arrow mark C direction of FIG. 4) and is extended from the base 66 along the longitudinal direction of the base 66.

Further, an outer diameter dimension of the base 66 is substantially equal to a diameter dimension of an imaginary circle circumscribing the electrode lines 20 through 26 centering on the center of the cross hole 18 and as shown by FIG. 2, the shaft 76 is insertingly fitted to an inner side of the outer skin portion 16 in a state of being substantially coaxial with the outer skin portion 16 until one end in the longitudinal direction of the base 66 is brought into contact with an end portion of the outer skin portion 16 on a side opposed to the support member 64.

(Constitution of Covering Portion 78)

Further, as shown by FIG. 2, a covering portion 78 is provided at a surrounding of the support member 64. A total of the covering portion 78 is formed by a thermoplastic resin material which is molded by hot melt molding of polyamide species, polypropylene species or silicone species and becomes transparent or semitransparent at least after curing (hereinafter, a thermoplastic resin material molded by hot melt molding is referred to as "hot melt molding resin material" for convenience). Further, the covering portion 78 is provided with a main body 80.

The main body 80 is formed substantially in a shape of a rectangular parallelepiped in which respectives of a longitudinal direction, a width direction and a thickness direction thereof correspond to the longitudinal direction (arrow mark C direction of FIG. 3 and FIG. 4), the width direction (arrow mark B direction of FIG. 3 and FIG. 4) and the thickness direction (arrow mark A direction of FIG. 3 and FIG. 4) of the base 66 and inside thereof is embedded with the base 66 and a portion of the shaft 76 of the support member 64, portions of one-end portions of the electrode lines 20 through 26, portions of the lead wires 34, the conductive pieces 68 through 74 and the resistor 32.

Further, at one end portion (end portion on a side opposed to an end portion of the outer skin portion 16) in a longitudinal direction of the main body 80 (arrow mark C direction side of FIG. 4), a cylindrical portion 82 substantially in a shape of a circular cylinder constituting an engaging portion is continuously formed to cover the end portion of the outer skin portion 16 and a vicinity thereof (a predetermined range from the end portion to a center side in the longitudinal direction) in a state of being brought into close contact with an outer peripheral portion of the outer skin portion 16.

Further, an outer peripheral shape of the cylindrical portion 82 is constituted by a circular shape substantially coaxial with an inner peripheral shape thereof. An inner diameter dimension of the cylindrical portion 82 is substantially equal to an outer diameter dimension of the outer skin portion 16, further, an outer diameter dimension of the cylindrical portion 82 is set to be larger than an inner diameter dimension of the cylindrical portion 40 of the protector 38 and the cylindrical portion 82 is press-fitted (engaged) from one end of the cylindrical portion 40.

Figure 5:
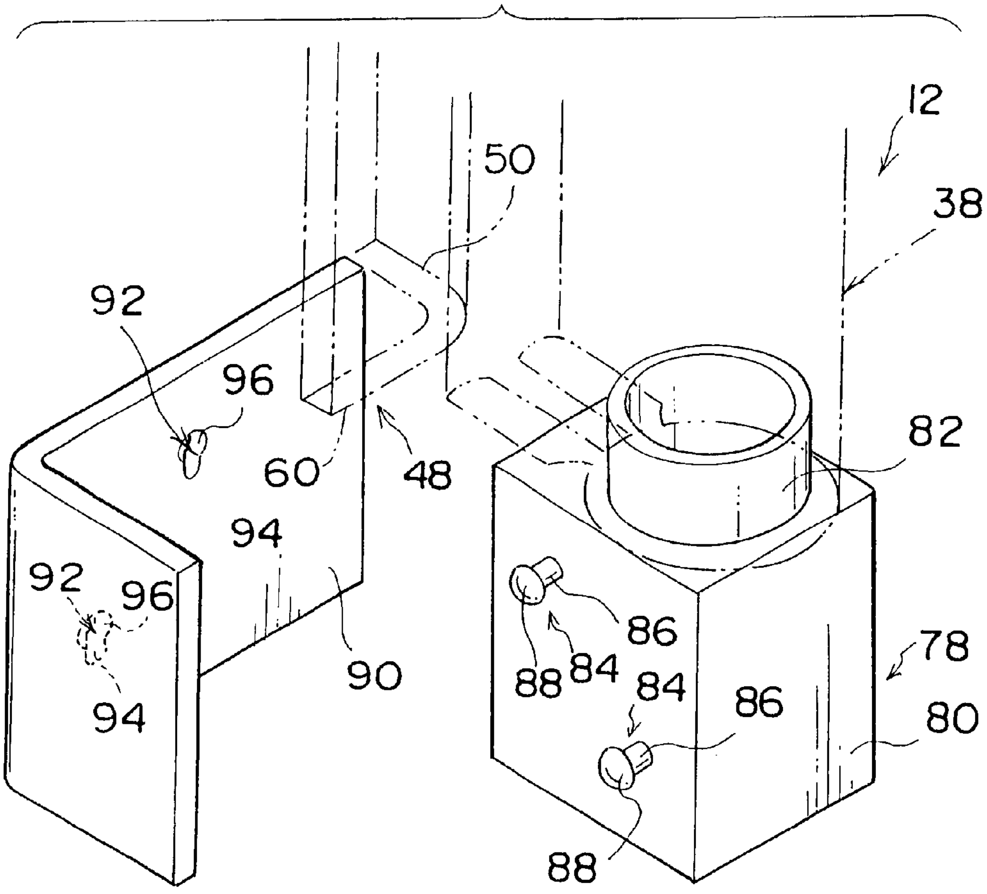
FIG. 5 is a disassembled perspective view showing a relationship between a bracket (cover) and a covering portion.

Meanwhile, as shown by FIG. 2 and FIG. 5, a plurality (two according to the embodiment) of holding projections 84 is formed to project from one outer side face of the main body 80. The holding projection 84 is formed by a synthetic resin material of a material the same as that of the synthetic resin material for forming the covering portion 78. The holding projection 84 is provided with a shaft portion 86 substantially in a shape of a circular cylinder. The shaft portion 86 is connected to an outer side face of the covering portion 78 at one end portion thereof in an axial direction. In contrast thereto, other end portion in the axial direction of the shaft portion 86 is formed with a draw preventive portion 88. The draw preventive portion 88 is formed substantially in a semispherical shape an outer diameter dimension of which is sufficiently larger than the shaft portion 86 and is connected coaxially to the shaft portion 86 at a plane portion thereof.

Figure 6:
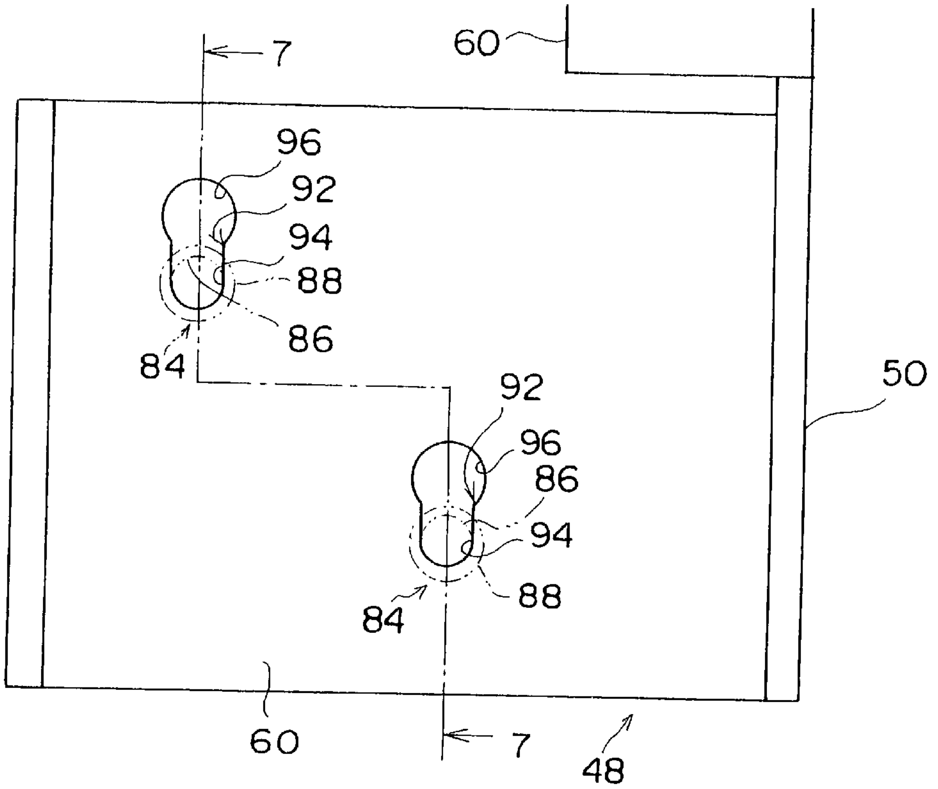
FIG. 6 is a side view of the cover.
Figure 7:
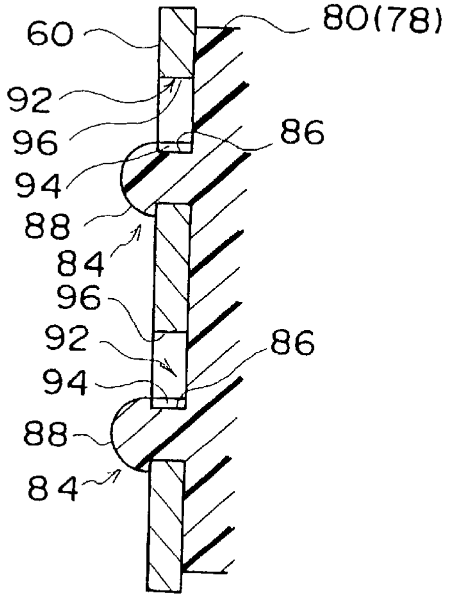
FIG. 7 is a sectional view taken along a line 7—7 of FIG. 6.

As shown by FIG. 5 through FIG. 7, in correspondence with the holding projections 84, the bracket 48 is formed with a cover 90. The cover 90 is formed in correspondence with a portion formed with the covering portion 78 in a state of attaching the protector 38 to the bracket 48. The cover 90 is extended from one end in a width direction, of a portion on one end side in the longitudinal direction of the attaching portion 42 constituting the bracket 48 (specifically, on the lower end side in an up and down direction of the vehicle 14 in a state of being attached to the vehicle 14) than the portion formed with the fit-in plate 60. The cover 90 is bent substantially in right angle at a middle portion in an extended direction thereof and is opposed to the attaching portion 42 substantially in parallel therewith on a front end side in the extended direction of the bent portion.

A pair of fitting holes 92 are formed between a base end portion (a portion connected to the attaching portion 42) of the cover 90 and the bent portion. The fitting hole 92 is provided with a long hole portion 94 which is elongated along the longitudinal direction of the attaching portion 42 and an inner width dimension of which is larger than an outer diameter dimension of the shaft portion 86 of the holding projection 84 and is sufficiently smaller than an outer diameter dimension of the draw preventive portion 88. Further, one end (upper end) in the longitudinal direction of the long hole portion 94 is formed with a fitting portion 96 an inner diameter dimension of which is larger than the outer diameter dimension of the draw preventive portion 88 continuously to the long hole portion 94. The holding projection 84 is fittable to and drawable from the fitting hole 92 in a state in which the shaft portion 86 is substantially coaxial with the fitting portion 96.

However, when the holding portion 84 (that is, covering portion 78) is intended to move in a direction of penetrating the fitting hole 92 in a state of penetrating the shaft portion 86 through the long hole portion 94, outer side faces of the draw preventive portion 88 and the covering portion 78 interfere with the cover 90 to thereby restrict the movement. That is, according to the embodiment, the holding projection 84 is fitted to the fitting hole 92 in a state in which the shaft portion 86 of the holding projection 84 and the fitting portion 96 of the fitting hole 92 becomes substantially coaxial, and by sliding the covering portion 78 to a lower side under the state until the shaft portion 86 is brought into contact with a lower end portion of the long hole portion 94, the covering portion 78 is attached to the cover 90 (that is, bracket 48).

(Constitution of support member 98)

Meanwhile, as shown by FIG. 2 and FIG. 3, on other end side in the longitudinal direction of the outer skin portion 16 (that is, side which is not provided with the support member 64 and the covering portion 78), a support member 98 as a terminal support member is provided. The support member 98 is provided with a base 100 as an insulating holding member. The base 100 is formed in a shape of a rectangular parallelepiped by an insulating material having comparatively high heat resistance (for example, synthetic resin material) and one end portion in a longitudinal direction thereof (arrow mark D direction of FIG. 3) is opposed to other end portion in the longitudinal direction of the outer skin portion 16.

Further, the base 100 is provided with a pair of conductive shafts 102 and 104 as connecting members, respectively. Each of the conductive shafts 102 and 104 is formed in a bar-like (wire-like) shape an outer diameter dimension of which is sufficiently smaller than a width dimension and a thickness dimension of the base 100, by a conductive member such as metal.

The conductive shaft 102 is provided so as to have a longitudinal direction thereof in the thickness direction (arrow mark E direction of FIG. 3) of the base 100 and penetrates the base 100 at substantially central portion in the width direction of a middle portion in the longitudinal direction of the base 100 such that both end sides in the longitudinal direction of the conductive shaft 102 are projected from both end faces in the thickness direction of the base 100. In contrast thereto, the conductive shaft 104 is provided so as to constitute a longitudinal direction thereof by the width direction (arrow mark F direction of FIG. 3) of the base 100 and penetrates the base 100 at substantially a central portion in the thickness direction of a position displaced from a penetrating position of the conductive shaft 102 along the longitudinal direction of the base 100 such that both end sides in the longitudinal direction of the conductive shaft 104 are projected from both end faces in the width direction of the base 100 (that is, the conductive shaft 104 is disposed at a position skewed relative to the conductive shaft 102).

One end portion in the longitudinal direction of the conductive shaft 102 is integrally attached fixedly with other end portion in the longitudinal direction of the electrode line 20 in an electrically conducted state and other end portion in the longitudinal direction of the conductive shaft 102 is integrally attached fixedly with other end portion in the longitudinal direction of the electrode line 24 in an electrically conducted state. In contrast thereto, one end portion in the longitudinal direction of the conductive shaft 104 is integrally attached fixedly with other end portion in the longitudinal direction of the electrode line 22 in an electrically conducted state and other end portion in the longitudinal direction of the conductive shaft 104 is integrally attached fixedly with other end portion in the longitudinal direction of the electrode line 26 in an electrically conducted state. Thereby, the electrode line 20, the electrode line 24, the resistor 32, the electrode line 22 and the electrode line 26 are connected in series.

Further, one end portion in the longitudinal direction (end portion on a side opposed to other end portion in the longitudinal direction of the outer skin portion 16) of the base 100 is formed with a shaft 106 in a shape of a round bar as an insertingly fitting portion. The shaft 106 is integrally formed with the base 100. A base end portion of the shaft 106 is connected to the base 100 substantially at a center in the width direction and the thickness direction (arrow mark E direction and arrow mark F direction of FIG. 3) at one end portion in the longitudinal direction (arrow mark D direction side of FIG. 3) of the base 100 and is extended from the base 100 along the longitudinal direction of the base 100.

Further, an outer diameter dimension of the base 100 is substantially equal to the diameter dimension of the imaginary circle circumscribing the electrode lines 20 through 26 centering on the center of the cross hole 18 and the shaft 106 is insertingly fitted to an inner side of the outer skin portion 16 in a state of being substantially coaxial with the outer skin portion 16 until one end in the longitudinal direction of the base 100 is brought into contact with an end portion of the outer skin portion 16 on a side opposed to the support member 64.

Further, the constitution of the terminal support member is not limited to the above-described constitution of the support member 98 and is not limited to the specific mode so far as respective is constituted by: a plurality of conductive connecting members for holding at least any two of respective terminal portions of a plurality of conductive members (electrode lines 20 through 26 according to the embodiment); and an insulating holding member interposed among the plurality of conductive members and holding the plurality of connecting members in a state in which the plurality of connecting members intersect with each other and intervals of the plurality of connecting members are electrically insulated.

According to the terminal support member having such a constitution, first, the insulating holding member is interposed among the plurality of conductive members and therefore, the plurality of conductive members are not brought into contact with each other.

Further, at least any two of the terminal portions of the plurality of conductive members are held by the conductive connecting members and conducted via the connecting members. Therefore, although the plurality of connecting members intersect with each other, the plurality of connecting members are held in a state of being insulated from each other by the insulating holding member. Therefore, the connecting members are not conducted. Thereby, other than predetermined conductive members terminal portions of which are connected to each other, is not conducted and a predetermined wire connected state can be maintained.

An explanation will be given of a modified example of the support member 98 as the terminal support member.

Figure 8:
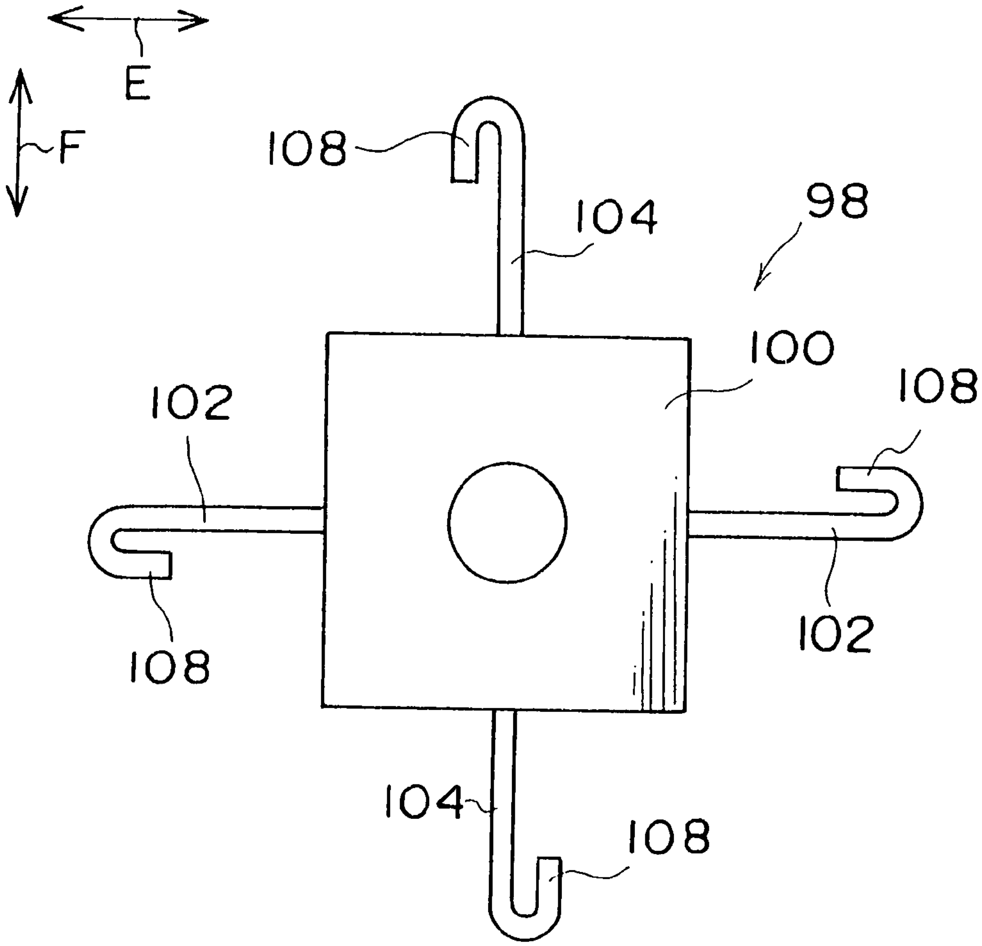
FIG. 8 is a plane view showing a modified example of other support member.

Although according to the embodiment, the conductive shafts 102 and 104 as the connecting members are simply in a rod-like shape, for example, as shown by FIG. 8, the conductive shafts 102 and 104 may be constructed by a constitution in which fold back portions 108 as terminal interposing portions constituted by folding back both front end sides of the conductive shafts 102 and 104 are formed and other end portions of corresponding ones of the electrode lines 20 through 26 are fixedly attached by the fold back portions 108 in a state of being temporarily interposed. When the constitution is constructed, the corresponding ones of the electrode lines 20 through 26 can be held by the fold back portions 108 without holding the electrode lines 20 through 26 by particularly other holding means and therefore, fixedly attaching operation is facilitated.

Figure 9:
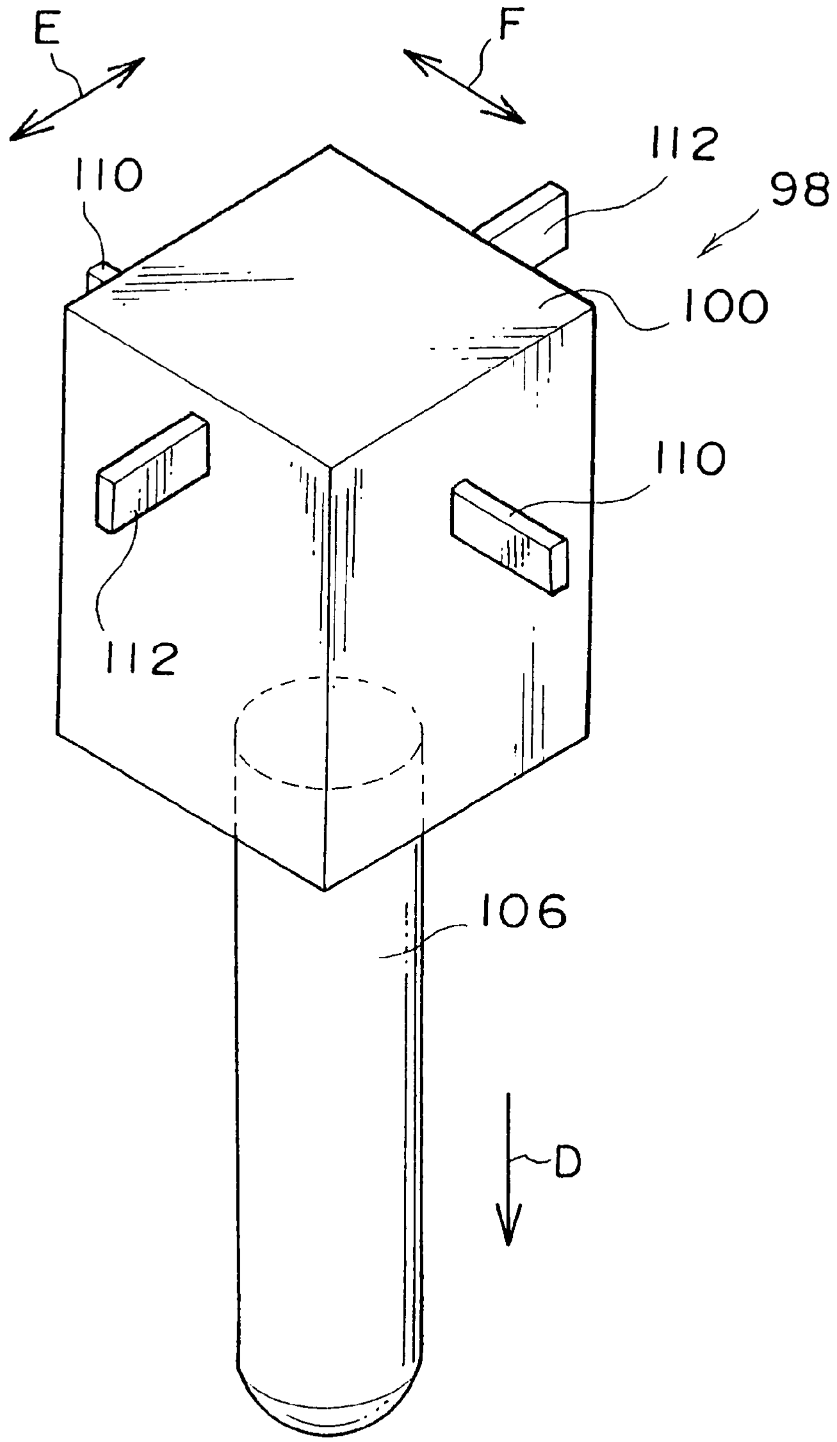
FIG. 9 is a perspective view showing other modified example of other support member.

Further, although according to the embodiment, the conductive shafts 102 and 104 in the shape of round bar are applied to the connecting members, as shown by FIG. 9, conductive plates 110 and 112 in a flat plate shape a thickness direction of which is directed to a radius direction of the outer skin portion 16 may constitute the connecting members.

When such a constitution is constructed, end portions of corresponding ones of the electrode lines 20 through 26 are fixedly attached to one-side faces in the thickness direction of the conductive plates 110 and 112, however, the corresponding ones of the electrode lines 20 through 26 may fixedly be attached to any portions so far as the portions are portions of the conductive plates 110 and 112 projected from the base 100 and therefore, amounts of extending the electrode lines 20 through 26 from the end portion of the outer skin portion 16 and positions of fixedly attaching the electrode lines 20 through 26 to the conductive plates 110 and 112 can be set comparatively roughly. Thereby, the electrode lines 20 through 26 can fixedly be attached simply to the conductive plates 110 and 112.

Figure 10:
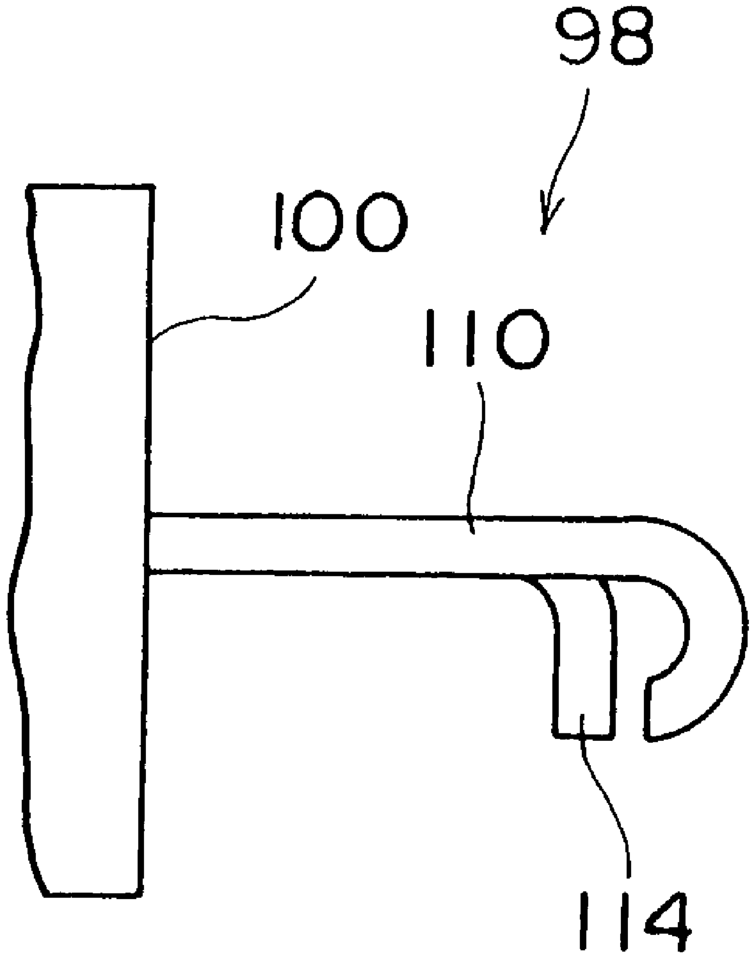
FIG. 10 is a perspective view showing a modified example of a connecting member of other support member.

Further, as shown by FIG. 10, the conductive plates 110 and 112 as the connecting members may be formed with holding pieces 114 having spring performance as the terminal interposing portions and corresponding ones of the electrode lines 20 through 26 may fixedly be attached to the conductive plates 110 and 112 in a state of being elastically interposed temporarily by the hold pieces 114. In this case, similar to the above-described constitution of forming the fold back portions 108, the corresponding ones of the electrode lines 20 through 26 can be held by the hold pieces 114 without holding the electrode lines 20 through 26 by particularly other holding means and therefore, the fixedly attaching operation is facilitated.

Further, by adhering (coating) "brazing material" formed by a low melting point alloy previously and integrally with surfaces of the conductive shafts 102 and 104 or the conductive plates 110 and 112, "brazing" operation which is one mode of the fixedly attaching operation of the electrode lines 20 through 26 and the conductive shafts 102 and 104 or the conductive plates 110 and 112 can easily be carried out.

(Constitution of Covering Portion 116)

Further, as shown by FIG. 2 and FIG. 3, a covering portion 116 is provided at a surrounding of the support member 64. A total of the covering portion 116 is formed by a photo-curing resin material which is cured by absorbing light energy and becomes transparent or semitransparent at least after having been cured. Further, the covering portion 116 is provided with a main body 118.

As a whole, the main body 118 is formed substantially in a shape of a circular cylinder a dimension in the axial direction (arrow mark D direction of FIG. 3) of which is sufficiently larger than a longitudinal direction of the base 100, and an outer diameter dimension thereof is sufficiently larger than a total length of the conductive shafts 102 and 104 and smaller than an inner diameter dimension of the cylindrical portion 40 of the protector 38. Inside of the main body 118 is embedded with the base 100, the conductive shafts 102 and 104 and vicinities of other end portions in the longitudinal direction of the electrode lines 20 through 26.

<Operation and Effect of First Embodiment>

Next, operation and effect of the embodiment will be explained.

(Basic Operation of Squeezing Detecting Apparatus 10)

According to the squeezing detecting apparatus 10, at least when the automatic slide door apparatus 52 moves the door panel 54 in a direction of closing an ingress and egress opening 122 of a vehicle 14, the electrode lines 20 through 26 of the pressure sensitive sensor 12 are brought into a conducted state.

In a state in which the door panel 54 is slid in the direction of closing the ingress and egress opening 122 by drive force of driving means of a motor, when a foreign matter is squeezed between an end portion (side end portion in a moving direction) of the door panel 54 and an opening edge of the ingress and egress opening 122 and the pressure sensitive sensor 12 which is moved integrally with the door panel 54 presses the foreign matter by the outer skin portion 16, reactive press force from the foreign matter is operated to the outer skin portion 16.

When the repulsive press force becomes equal to or larger than a predetermined magnitude, the outer skin portion 16 is elastically deformed such that a section thereof is crushed in a direction in which the repulsive press force is applied against elastic force of its own. When the outer skin portion 16 is elastically deformed in this way, any of the electrode lines 20 through 26 provided at inside of the outer skin portion 16 are bent in accordance with elastic deformation of the outer skin portion 16.

Normally, current flowing from the electrode line 20 to the electrode line 26 via the electrode lines 24 and 22 flows normally via the resistor 32. However, when any of the electrode lines 20 through 26 are bent as described above, thereby, the electrode line 20 or the electrode line 24 is conducted to the electrode line 22 or the electrode line 26 and shortcircuited, the current flows without interposing the resistor 32 and therefore, a current value is changed when current is made to flow to the circuit by constant voltage.

In this way, when the repulsive press force from the foreign matter is applied, the current value of the current flowing in the electric circuit including the electrode lines 20 through 26 is changed and therefore, the pressure sensitive sensor 12 can detect operation of the repulsive press force from the foreign matter, that is, squeezing of the foreign matter. Further, the change of the current value is detected by the current detecting element 36.

Further, when an electric signal (detecting signal) from the current detecting element 36 is received by determining means or controlling means of ECU, the determining means or the controlling means determines that external force is operated to the outer skin portion 16, that is, the foreign matter is squeezed between the end portion (end portion on a side of moving direction) of the door panel 54 and the opening edge of the ingress and egress opening 122. Then, by stopping driving means of a motor or the like for sliding the door panel 54 by the determining means or the controlling means, further squeezing of the foreign matter can be prevented. Further, by reversely driving the driving means of the motor or the like for sliding the door panel 54 by the determining means or the controlling means, squeezing of the foreign matter can be released.

Further, according to the pressure sensitive sensor 12, when the electrode line 20 and the electrode line 22 or the electrode line 24 and the electrode line 26 are shortcircuited, current flows via the resistor 32. Therefore, in this case, when the electrode lines 20 through 26 at inside of the outer skin portion 16 are not constituted spirally as in the invention, in view of the structure, external force cannot be detected.

However, as described above, the electrode lines 20 through 26 are arranged spirally at inside of the outer skin portion 16 and therefore, for example, when external force from the same direction is continuously operated to a range from predetermined portions of the electrode lines 20 through 26 at inside of the outer skin portion 16 to portions thereof at which the electrode lines 20 through 26 are turned spirally substantially by a half turn along the longitudinal direction of the outer skin portion 16, all of the electrode lines 20 through 26 are brought into contact with each other.

Therefore, even when the electrode line 20 and the electrode line 22 or the electrode line 24 and the electrode line 26 are brought into contact with each other, the electrode line 20 or the electrode line 24 can be brought into contact with the electrode line 22 or the electrode line 26 in a range shorter than the range of the electrode lines 20 through 26 from the predetermined portions at inside of the outer skin portion 16 to the portions at which the electrode lines 20 through 26 are turned spirally by substantially a half turn and a possibility of bringing only the electrode line 20 and the electrode line 22 or the electrode line 24 and the electrode line 26 into contact with each other is extremely low. Therefore, the pressure sensitive sensor 12 can detect external force substantially without fail.

(Explanation of Terminal Connecting Step on Covering Portion 78 Side)

Next, an explanation will be given of a wire connecting step of treating terminal portions on one-end sides in the longitudinal direction of the electrode lines 20 through 26 of the pressure sensitive sensor 12.

In a wire connecting step, first, the shaft 76 is insertingly fitted from one end of the outer skin portion 16 to an inner side thereof in a state in which the base 66 previously fixed with the conductive pieces 68 through 74 and the resistor 32 is interposed between the electrode lines 20 and 26 and the electrode lines 22 and 24 extended from the one end of the outer skin portion 16.

Next, in a connecting step, the one-end portions in the longitudinal direction of the electrode lines 20 through 26 and the conductive pieces 68 through 74 in correspondence therewith are fixedly attached by, for example, resistance welding. Thereby, the one-end portions in the longitudinal direction of the electrode lines 20 through 26 and the conductive pieces 68 through 74 in correspondence therewith are integrally connected in a conducted state.

Further, under the state, the conductive pieces 72 and 74 and end portions of the lead wires 34 in correspondence therewith are fixedly attached by, for example, resistance welding. Thereby, the lead wires 34 and the conductive pieces 70 and 76 in correspondence therewith are integrally connected in a conducted state.

Next, in a molding step, the support member 64 and a portion of the outer skin portion 16 at a vicinity of the one end in the longitudinal direction are set to an inner side of a molding die and under the state, the hot melt molding resin material melted in a liquid state by being heated is filled in the molding die.

Under the state, the melted (liquid) hot melt molding resin material is cooled and cured to thereby form the covering portion 78 including the cylindrical portion 82 and the holding projection 84.

At this occasion, the support member 64, vicinities of one-side ends of the electrode lines 20 through 26, the resistor 32, the conductive pieces 68 through 74 and vicinities of one-side ends of the lead wires 34 are sealed in the covering portion 78 in an embedded state and therefore, water or dust is prevented from being adhered to respective connecting portions of the electrode lines 20 through 26, that resistor 32, the conductive pieces 68 through 74 and the lead wires 34.

Further, the conductive pieces 68 through 74 are basically fitted to the support member 64 and therefore, mechanical strength thereof against external force is high and by being embedded in and sealed by the covering portion 78 as described above, the respective connecting portions of the electrode lines 20 through 26, the resistor 32, the conductive pieces 68 through 74 and the lead wires 34 are supported not only by support member 64 but also by the covering portion 78 at surroundings thereof. Thereby, deformation of the respective connecting portions of the electrode lines 20 through 26, the resistor 32, the conductive pieces 68 through 74 and the lead wires 34 is further solidly restricted and disconnection at the respective connecting portions can firmly be prevented.

Further, the one end of the outer skin portion 16 and a vicinity thereof are also sealed in the covering portion 78 in an embedded state and therefore, water or dust can be prevented from invading from the one end of the outer skin portion 16 to inside of the outer skin portion 16. Thereby, water which invades inside of the outer skin portion 16 can be prevented from conducting or corroding the electrode lines 20 through 26 which are not brought into contact with each other. Further, a foreign matter of dust or the like can be prevented from hampering the electrode lines 20 through 26 from being bent.

Further, the hot melt molding resin material for forming the covering portion 78 becomes transparent or semitransparent at least in a cured state and therefore, even when the support member 64, vicinities of the one-ends of the electrode lines 20 through 26, the resistor 32, the conductive pieces 68 through 74 and the vicinities of the one-ends of the lead wires 34 are covered by the covering portion 78 in the embedded state, a state of inside of the covering portion 78 can easily be confirmed from outside thereof. Thereby, presence or absence of disconnection at the respective connecting portions of the electrode lines 20 through 26, the resistor 32, the conductive pieces 68 through 74 and the lead wires 34 can easily be inspected. Thus, after producing the pressure sensitive sensor 12, a number of steps for inspecting presence or absence of disconnection at the connecting portions in assembling the squeezing detecting apparatus 10 to the vehicle 14 or in maintenance can effectively be reduced.

Further, as described above, the covering portion 78 is formed by the hot melt molding resin material. In this case, molding pressure in molding the hot melt molding resin material is lower than molding pressure in, for example, molding by a general injection molding method. Therefore, a possibility of effecting adverse influence on the respective connecting portions of the electrode lines 20 through 26, the resistor 32, the conductive pieces 68 through 74 and the lead wire 34 by the molding pressure is extremely low and disconnection by operating the molding pressure to the connecting portions can reliably be prevented.

Further, the molding pressure in molding the hot melt molding resin material for forming the covering portion 78 is low and therefore, when the one end of the outer skin portion 16 and also a vicinity thereof are sealed by the covering portion 78, flowing of the thermoplastic resin material which is melted in a liquid state from one end of the outer skin portion 16 to inside of the outer skin portion 16 can be alleviated. Thereby, occurrence of operational failure of the pressure sensitive sensor 12 caused by curing the synthetic resin material in a state in which a large amount of the synthetic resin material unpreparedly flows into the outer skin portion 16 can be prevented or alleviated.

(Explanation of terminal connecting step on side of covering portion 116)

Next, an explanation will be given of a wire connecting step of treating terminal portions on other end sides in the longitudinal direction of the electrode lines 20 through 26 of the pressure sensitive sensor 12.

In the wire connecting step, first, in a support member mounting step, the shaft 106 is inserted into the outer skin portion 16 until an end portion in the longitudinal direction of the base 100 on a side opposed to other end in the longitudinal direction of the outer skin portion 16 is brought into contact with the end in the longitudinal direction of the outer skin portion 16.

Figure 11:
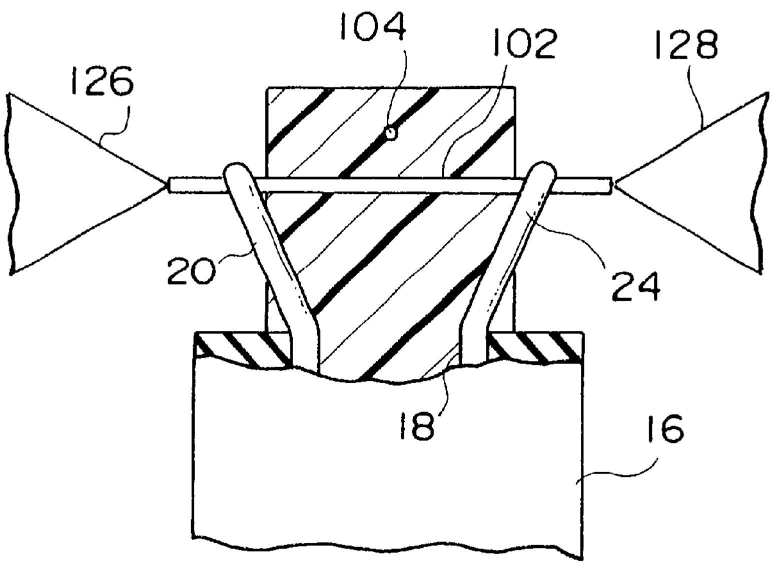
FIG. 11 is a view showing a welding step on a side of other support member.

Successively, in a welding step, as shown by FIG. 11, other end portions of the electrode lines 20 trough 26 extended from the other end in the longitudinal direction of the outer skin portion 16 are locked to vicinities of end portions of the corresponding conductive shafts 102 and 104. Under the state, for example, an end portion of a welding electrode 126 is brought into contact with one end of the conductive shaft 102 and a ground electrode 128 is brought into contact with other end thereof.

When welding current is made to flow from the welding electrode 126 to the ground electrode 128 via the conductive shaft 102 under the state, the conductive shaft 102 is melted from both ends thereof. A molten portion is displaced to a central portion in the longitudinal direction of the conductive shaft 102 while forming substantially a spherical shape or substantially a tear drop shape and melts a center side of the conductive shaft 102 which is not melted yet by the heat. Further, the molten portion of the conductive shaft 102 involves end portions of the electrode lines 20 and 24 and cooled and solidified under the state. Thereby, the conductive shaft 102 and the electrode lines 20 and 24 are integrally connected in a conducted state. Further, similar operation is carried out also for the conductive shaft 104, thereby, the conductive shaft 104 and the electrode lines 22 and 26 are integrally connected in a conducted state.

Figure 12:
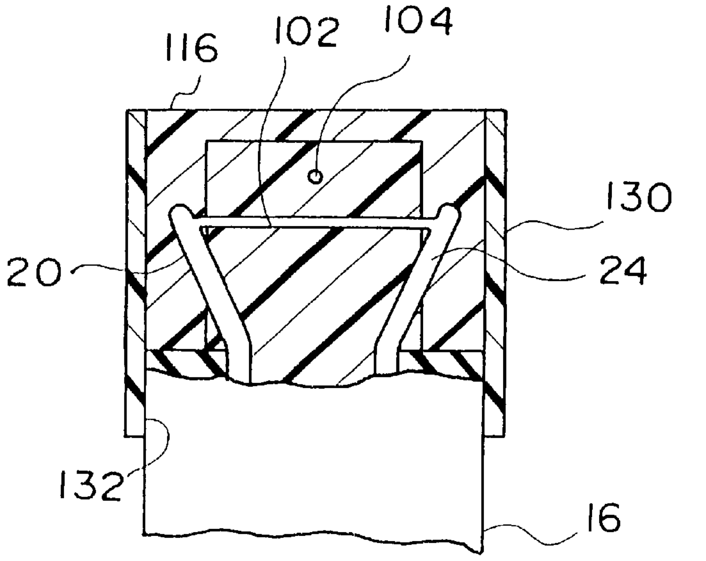
FIG. 12 is a view showing a molding step on the side of other support member.

Next, as shown by FIG. 12, in a molding step, a sleeve 130 as a molding die is mounted to the other end portion of the outer skin portion 16. The sleeve 130 is formed in a shape of a cylinder an inner diameter dimension of which is substantially equal to an outer diameter dimension of the outer skin portion 16. As shown by FIG. 12, in a state of mounting the sleeve 130 to the outer skin portion 16, the outer skin portion 16 penetrates a circular hole 132 and an end portion of the base 100 on a side opposed to the other end of the outer skin portion 16 is disposed on a bottom side of the sleeve 130 more than an opening end of the sleeve 130.

Under the state, a photo-curing resin material is filled at inside of the sleeve 130 until a liquid level of the photo-curing resin material in a molten state is disposed on a side of the opening end of the sleeve 130 rather than the end portion of the base 100 on the side opposed to the other end of the outer skin portion 16. Under the state, the photo-curing resin material is cured at inside of the sleeve 130 to thereby form the covering portion 116.

In this case, vicinities of other ends of the support member 98 and the electrode lines 20 through 26 are sealed in the covering portion 116 in an embedded state and therefore, water or dust can be prevented from adhering to the connecting portions of the electrode lines 20 through 26 and the conductive shafts 102 and 104.

Further, by sealing to embed the connecting portions of the electrode lines 20 through 26 and the conductive shafts 102 and 104 in the covering portion 116, the connecting portions of the electrode lines 20 through 26 and the conductive shafts 102 and 104 are supported by the covering portion 116 at a surrounding thereof. Thereby, deformation of the connecting portions of the electrode lines 20 through 26 and the conductive shafts 102 and 104 is solidly restricted and disconnection at the respective connecting portions can reliably be prevented.

Further, the photo-curing resin material for forming the covering portion 116 becomes transparent or semitransparent at least in a cured state and therefore, even when the connecting portions of the electrode lines 20 through 26 and the conductive shafts 102 and 104 are covered by the covering portion 116 in the embedded state, a state of inside of the covering portion 116 can easily be confirmed from outside thereof. Thereby, presence or absence of disconnection at the connecting portions of the electrode lines 20 through 26 and the conductive shafts 102 and 104 can easily be inspected and after producing the pressure sensitive sensor 12, a number of steps of an inspecting step for inspecting presence or absence of disconnection at the connecting portions in assembling the squeezing inspecting apparatus 10 to the vehicle 14 or in maintenance can effectively be reduced.

Further, as described above, the covering portion 116 is formed by the photo-curing resin material. In this case, molding pressure in molding the photo-curing resin material is lower than molding pressure in molding by, for example, a general injection molding method or molding pressure per se is not necessary. Therefore, a possibility of effecting adverse influence on the connecting portions of the electrode lines 20 through 26 and the conductive shafts 102 and 104 by the molding pressure is extremely low and disconnection by operating the molding pressure to the connecting portions can firmly be prevented.

Further, according to the photo-curing resin material for forming the covering portion 116, since the molding pressure in molding is low or the molding pressure is not necessary, when the other end of the outer skin portion 16 and also a vicinity thereof are sealed by the covering portion 116, flowing of the photo-sensitive resin material which is melted in a liquid state from one end of the outer skin portion 16 to inside of the outer skin portion 16 can be alleviated. Thereby, occurrence of operational failure of the pressure sensitive sensor 12 caused by curing the synthetic resin material in a state in which a large amount of the synthetic resin material is made to flow unpreparedly into the outer skin portion 16 can be prevented or alleviated.

Further, according to the support member 98, the conductive shafts 102 and 104 respectively penetrate the base 100 in a state in which the longitudinal direction of the conductive shaft 104 is displaced from the longitudinal direction of the conductive shaft 102 substantially by 90 degrees and therefore, even when the electrode line 20 and the electrode line 24 as well as the electrode line 22 and the electrode line 26 are connected such that respective positions thereof are shifted substantially by 90 degrees and intersected with each other as in the electrode lines 20 through 26, the electrode lines 20 through 26 can be connected without being bent forcibly.

(Assembling Step of Squeezing Detecting Apparatus 10)

According to the pressure sensitive sensor 12 formed with the covering portions 78 and 116 as described above, the covering portion 116 is inserted from the one end side of the cylindrical portion 40 of the protector 38. The covering portion 116 inserted into the cylindrical portion 40 passes inside of the cylindrical portion 40 and is drawn out from the other end of the cylindrical portion 40 to an outer side. The covering portion 116 is formed at the pressure sensitive sensor 12 and therefore, the outer skin portion 16 is arranged at inside of the cylindrical portion 40 by passing the covering portion 116 through the cylindrical portion 40 as described above.

Further, by moving the outer skin portion 16 through the cylindrical portion 40 until the covering portion 116 passes through the cylindrical portion 40 and is drawn out, the covering portion 78 reaches the one end of the cylindrical portion 40. In this state, the cylindrical portion 82 formed on the covering portion 78 is pressed into the one end of the cylindrical portion 40. Thereby, the outer skin portion 16 and the covering portion 78 are integrated via the protector 38. Therefore, displacement of the covering portion 78 relative to the outer skin portion 16 is difficult to be brought about and disconnection at the connecting portions of the electrode lines 20 through 26 and the conductive pieces 68 through 74 or the conductive shafts 102 and 104 by the displacement of the covering portion 78 relative to the outer skin portion 16, can be prevented.

Under the state, the adhering agent 62 in the molten state is filled in the groove portion 44 of the protector 38 and the fit-in plate 60 of the bracket 48 is fitted into the groove 44.

Successively, the respective holding projections 84 formed at the covering portion 78 are fitted to the corresponding fitting portions 96 of the fitting holes 92. By sliding the covering portion 78 under the state until the shaft portion 86 is brought into contact with the end portion of the long hole portion 94 on the side opposed to the fitting portion 96, the covering portion 78 and the cover 90 of the bracket 48 are mechanically connected. Thereby, the covering portion 78 is mechanically connected to the outer skin portion 16 via the bracket 48 and the protector 38 at a portion thereof separate from the cylindrical portion 82. Therefore, the displacement of the covering portion 78 relative to the outer skin portion 16 is further difficult to be brought about, for example, disconnection of the connecting portion of the electrode lines 20 through 26 and the conductive pieces 68 through 74 can further reliably be prevented by the displacement of the covering portion 78 relative to the outer skin portion 16, in transporting the pressure sensitive sensor 12 attached to the bracket 48.

Further, the above-described connection may be carried out by aligning the holding projection 84 to the fitting portions 96 substantially coaxially and the operator does not set or determine a position of assembling the covering portion 78 to the cover 90. Therefore, operation of attaching the covering portion 78 to the cover 90 can be carried out in a short period of time with no need of skill. Thereby, a number of steps of operation can be reduced.

Further, the holding projection 84 is formed by molding the covering portion 78 and therefore, it is not necessary to newly integrate the holding projection 84 to the covering portion 78, thereby, a number of steps of operation can be reduced, further, a number of parts is not increased, which contributes also to a reduction in part cost.

Further, although according to the embodiment, the hot melt molding resin material is used for the covering portion 78 and the photo-curing resin material is used for the covering portion 116, the photo-curing resin material may be used for the covering portion 78 and the hot melt molding resin material may be used for the covering portion 116.

<Constitution of Second Embodiment>

Next, other embodiment of the invention will be explained. Further, in explaining the following respective embodiment, portions/members basically the same as those of the foregoing embodiments (e.g., portions/members of the second embodiment basically the same as those of the first embodiment) are attached with the same notations and an explanation thereof will be omitted.

Figure 16:
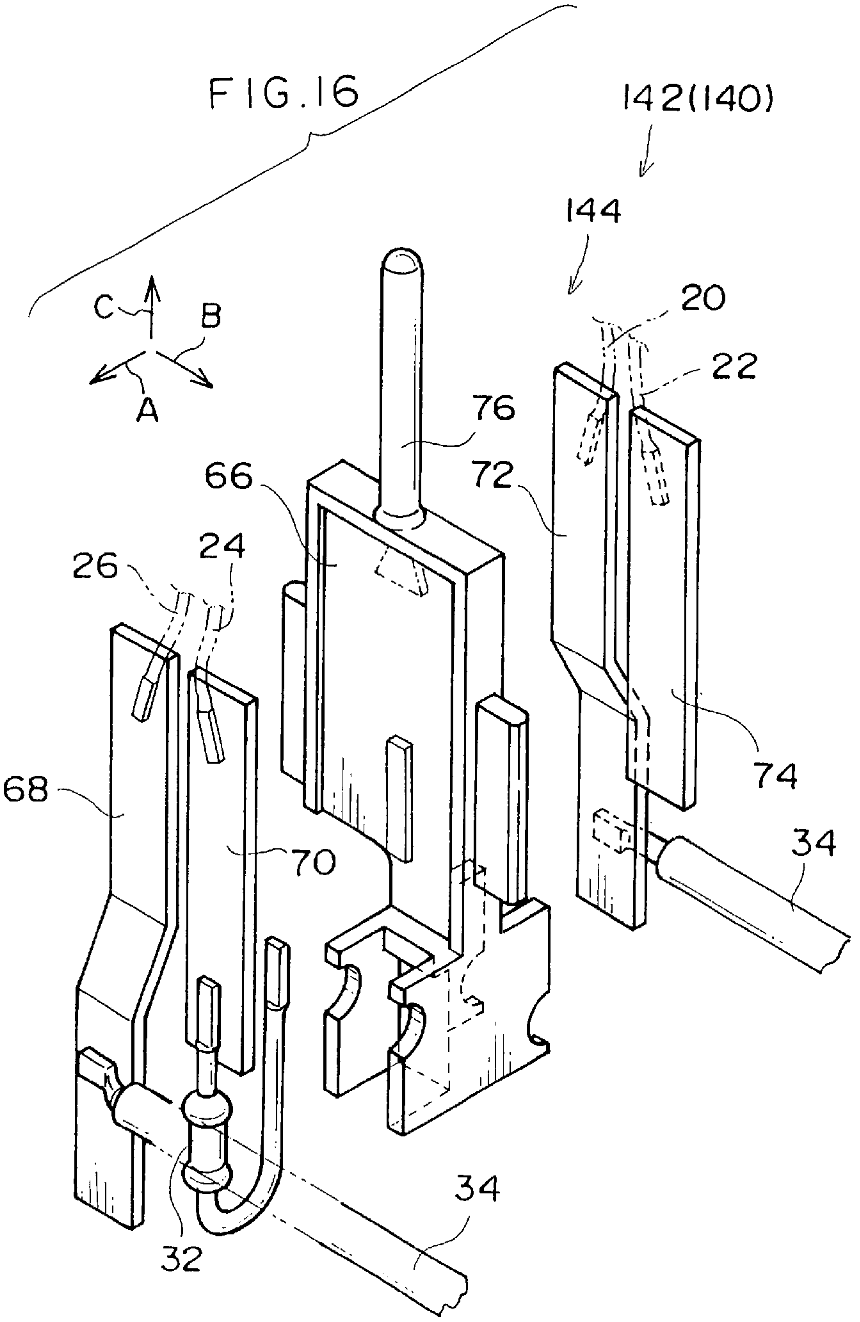
FIG. 16 is a disassembled perspective view in correspondence with FIG. 4 showing a constitution of an essential portion of a pressure sensitive sensor according to a second embodiment of the invention.

FIG. 16 shows a constitution of an essential portion of a pressure sensitive sensor 142 of a squeezing detecting apparatus 140 as a pressure detecting apparatus according to a second embodiment of the invention by a disassembled perspective view.

As shown by FIG. 16, the pressure sensitive sensor 142 is provided with a support member 144 in place of the support member 64. The support member 144 is provided with the base 66 formed substantially in a shape of a rectangular plate by an insulating synthetic resin material similar to the support member 64. Further, the conductive pieces 68 and 70 are integrally molded on one side in the thickness direction (arrow mark A direction of FIG. 16) of the base 66 by insert molding and the conductive pieces 72 and 74 are integrally molded on other side in the thickness direction (direction opposed to the arrow mark A of FIG. 16) by insert molding.

However, according to the support member 144, the electrode line 26 is connected to the conductive piece 68 and the electrode line 20 is connected to the conductive piece 72. Further, the lead wires 34 are connected to the conductive pieces 68 and 72 from sides in the width direction (arrow mark B direction side of FIG. 16) of the conductive pieces 68 and 72.

Meanwhile, the electrode line 24 is connected to the conductive piece 70 and the electrode line 22 is connected to the conductive piece 74. The resistor 32 is arranged at a side in the longitudinal direction of the conductive piece 70 and one lead wire of the resistor 32 is connected to the conductive piece 70. Other lead wire of the resistor 32 is connected to the conductive piece 74 by circumventing from a side at other end portion in the longitudinal direction of the base 66 to other side in the thickness direction of the base 66.

<Operation and Effect of Second Embodiment>

Meanwhile, in the case of the support member 64 according to the first embodiment, the electrode lines 22 and 24 are extended from one side in the thickness direction of the base 66 and the electrode lines 24 and 26 are extended from other side thereof. In contrast thereto, in the case of the support member 144, the electrode lines 24 and 26 are extended from one side in the thickness direction of the base 66 and the electrode lines 20 and 22 are extended from other side thereof.

Here, at inside of the outer skin portion 16, the respective electrode lines 20 through 26 are spirally arranged around the axis center of the outer skin portion 16. Therefore, positions of the respective electrode lines 20 through 26 differ around the axis center of the outer skin portion 16 by a position of cutting the outer skin portion 16 along the longitudinal direction. Therefore, when the support member 64 and the support member 144 are properly used in accordance with states (extended position) of the respective electrode lines 20 through 26, the respective electrode lines 20 through 26 can pertinently be connected without changing the width direction of the base 66, further, without forcibly bending the respective electrode lines 20 through 26.

In the case of the support member 64 according to the first embodiment, the lead wires 34 are connected to the conductive pieces 72 and 74 from the side in the longitudinal direction of the base 66. In contrast thereto, in the case of the support member 144, the lead wires 34 are connected to the conductive pieces 70 and 74 from the side in the width direction (direction orthogonal to extending direction or longitudinal direction of the respective electrode lines 20 through 26) of the base 66. That is, depending on a wiring state (extended state) of the lead wire 34, there is a case in which the lead wire 34 can be connected without forcibly bending the lead wire 34 by connecting the lead wire from the side in the width direction of the base 66 by the support member 144 and in this case, mechanical load on the lead wire 34 can be alleviated.

<Constitution of Third Embodiment>

Next, a third embodiment of the invention will be explained.

Figure 17:
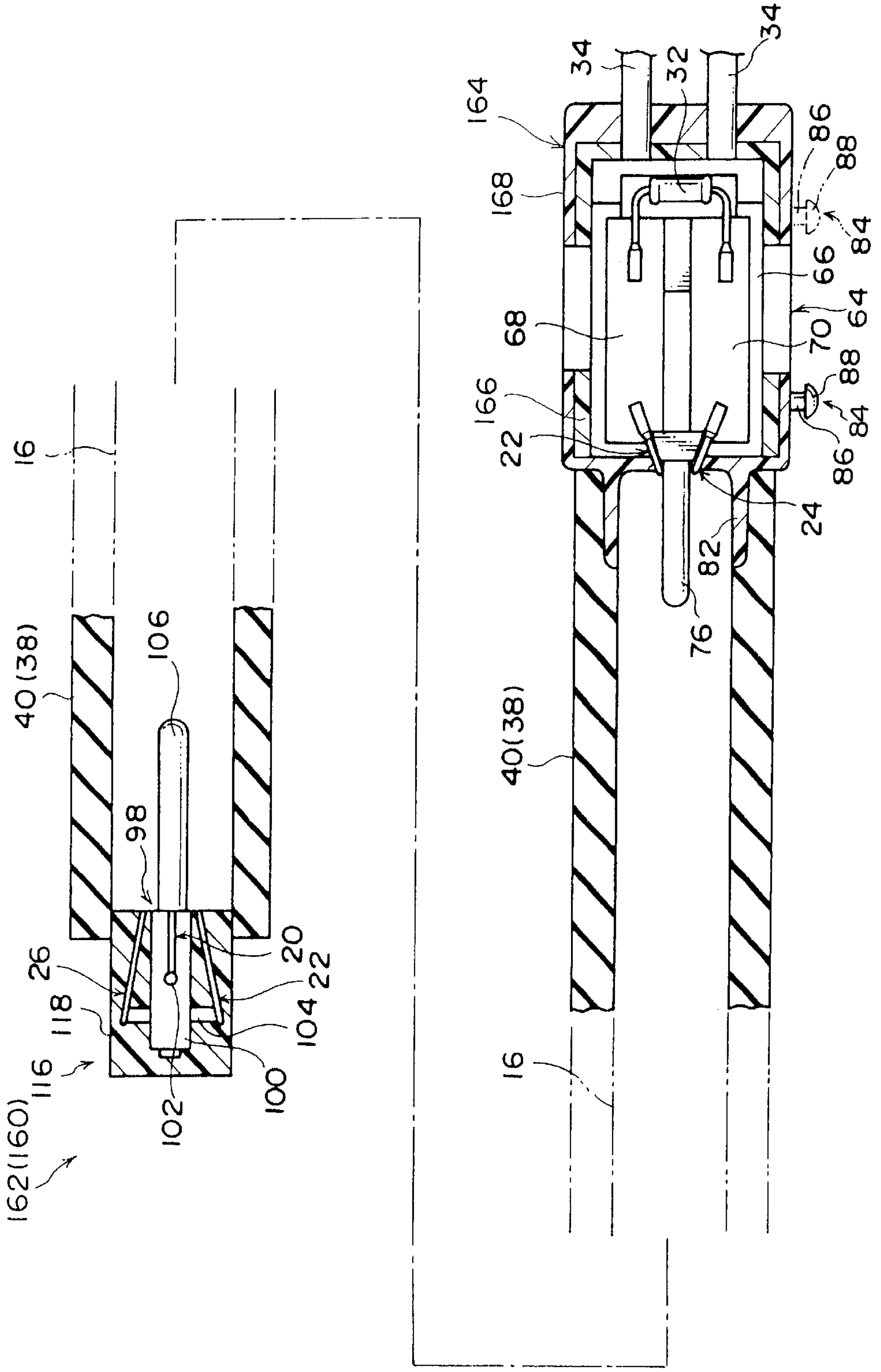
FIG. 17 is a sectional view in correspondence with FIG. 2 showing a constitution of an essential portion of a pressure sensitive sensor according to a third embodiment of the invention.

FIG. 17 shows a constitution of an essential portion of a pressure sensitive sensor 162 of a squeezing detecting apparatus 160 as a pressure detecting apparatus according to the present embodiment by a sectional view.

As shown by FIG. 17, a covering portion 164 is provided at one end of the pressure sensitive sensor 162 in place of the covering portion 78. Different from the covering portion 78, the covering portion 164 is constituted by an inner layer 166 and an outer layer 168.

The inner layer 166 is formed in a shape of a substantially rectangular parallelepiped by a photo-curing resin material which is cured by absorbing light energy and at inside thereof, a longitudinal direction, a width direction, and a thickness direction of which respectively correspond to the longitudinal direction, the width direction and the thickness direction of the base 66, and in which the base 66 of the support member 64, portions of one-end portions of the electrode lines 20 through 26, portions of the lead wires 34, the conductive pieces 68 through 74 and the resistor 32 are embedded.

In contrast thereto, the total of the outer layer 168 is formed by a hot melt molding resin material having a rigidity higher than that of the photo-curing resin material for constituting the inner layer 166 in a cured state. Further, the outer layer 168 is formed in a shape of a rectangular parallelepiped a longitudinal direction, a width direction and a thickness direction of which are respectively larger than those of the inner layer 166 to cover the inner layer 166 from an outer side of the inner layer 166. Further, the outer layer 168 is embedded with the one end portion of the outer skin portion 16 and a vicinity portion thereof and formed with the cylindrical portion 82 and the holding projection 84.

<Operation and Effect of Third Embodiment>

In forming the covering portion 164 having the above-described constitution, first, the support member 64 finished with the wiring step explained in the first embodiment is set to inside of an inner layer molding die and a photo-curing resin material which is melted in a liquid state is filled to inside thereof. The inner layer 166 is formed by curing the photo-curing resin material under the state. Successively, the one end portion of the outer skin portion 16 and a vicinity thereof are set to inside of an outer layer molding die along with the inner layer 166 and a hot melt molding resin material which is melted in a liquid state by being heated is filled in the mold under the state. The outer layer 168 is formed by cooling and curing the hot melt molding resin material under the state to thereby form the covering portion 164.

Although the covering portion 164 formed as described above differs from the covering portion 78 in the constitution in that the covering portion 164 is constituted by two layers of the inner layer 166 and the outer layer 168, the covering portion 164 is the same as the covering portion 78 in that a vicinity of the one end portion of the outer skin portion 16, the support member 64, portions of one-end portions of the electrode lines 20 through 26, portions of the lead wires 34, the conductive pieces 68 through 74 and the resistor 32 are embedded in the covering portion. Therefore, basically operation equivalent to operation achieved by forming the covering portion 78 is achieved and an effect equivalent to an effect achieved by forming the covering portion 78 can be achieved.

Further, the outer layer 168 is higher than the inner layer 166 in the rigidity and the shape is maintained (that is, difficult to be deformed) even when external force (for example, impact) is operated to the covering portion 164. When the covering portion 164 is assumedly deformed by applying external force to the covering portion 164, in accordance therewith, there is a possibility of cutting connection (disconnecting) between the conductive pieces 68 through 74 and one-end portions of the electrode lines 20 through 26 or end portions of the lead wires 34 at inside of the covering portion 164.

However, since as described above, the rigidity of the outer layer 168 is higher than that of the inner layer 166, a possibility of deforming the covering portion 164 by application of external force is lower than that when a total of the covering portion 164 is formed only by the photo-curing resin material for constituting the inner layer 166. Thereby, disconnection caused by the above-described deformation of the covering portion 164 can be prevented and connection between the conductive pieces 68 through 74 and the one-end portions of the electrode lines 20 through 26 or end portions of the lead wires 34 can be maintained over a long period of time.

Meanwhile, when the covering portion 164 is formed only by the synthetic resin material for constituting the outer layer 168, (that is, a molding resin material having a high rigidity after having been cured), since the rigidity is comparatively high, when impact or vibration is operated to the covering portion 164, impact or vibration is transmitted to the connecting portions of the conductive pieces 68 through 74 and the one-end portions of the electrode lines 20 through 26 or the end portions of the lead wires 34.

In this case, according to the embodiment, since the inner layer 166 is provided with the rigidity lower than that of the outer layer 168, that is, higher elasticity, the above-described impact or vibration is absorbed by the inner layer 166 before being transmitted to the connecting portions of the conductive pieces 68 through 74 and the one-end portions of the electrode lines 20 through 26 or the end portions of the lead wires 34. Connection between the conductive pieces 68 through 74 and the one-end portions of the electrode lines 20 through 26 or the end portions of the lead wires 34 can further reliably be maintained over a long period of time.

Further, according to the embodiment, the inner layer 166 is formed by the photo-curing resin material and the outer layer 168 is formed by the hot melt molding resin material. However, respectives of the inner layer 166 and the outer layer 168 may be formed by the photo-curing resin material or the hot melt molding resin material such that the rigidity of the outer layer 168 may be higher than that of the inner layer 166.

Therefore, so far as the rigidity of the outer layer 168 is higher than that of the inner layer 166, the inner layer 166 may be formed by the hot melt molding resin material and the outer layer 168 may be formed by the photo-curing resin material. Further, so far as the rigidity of the outer layer 168 is higher than that of the inner layer 166, both of the outer layer 168 and the inner layer 166 may be formed by the photo-curing resin material and both of the outer layer 168 and the inner layer 166 may be formed by the hot melt molding resin material.

<Fourth Embodiment>

Next, a fourth embodiment of the invention will be explained.

Figure 18:
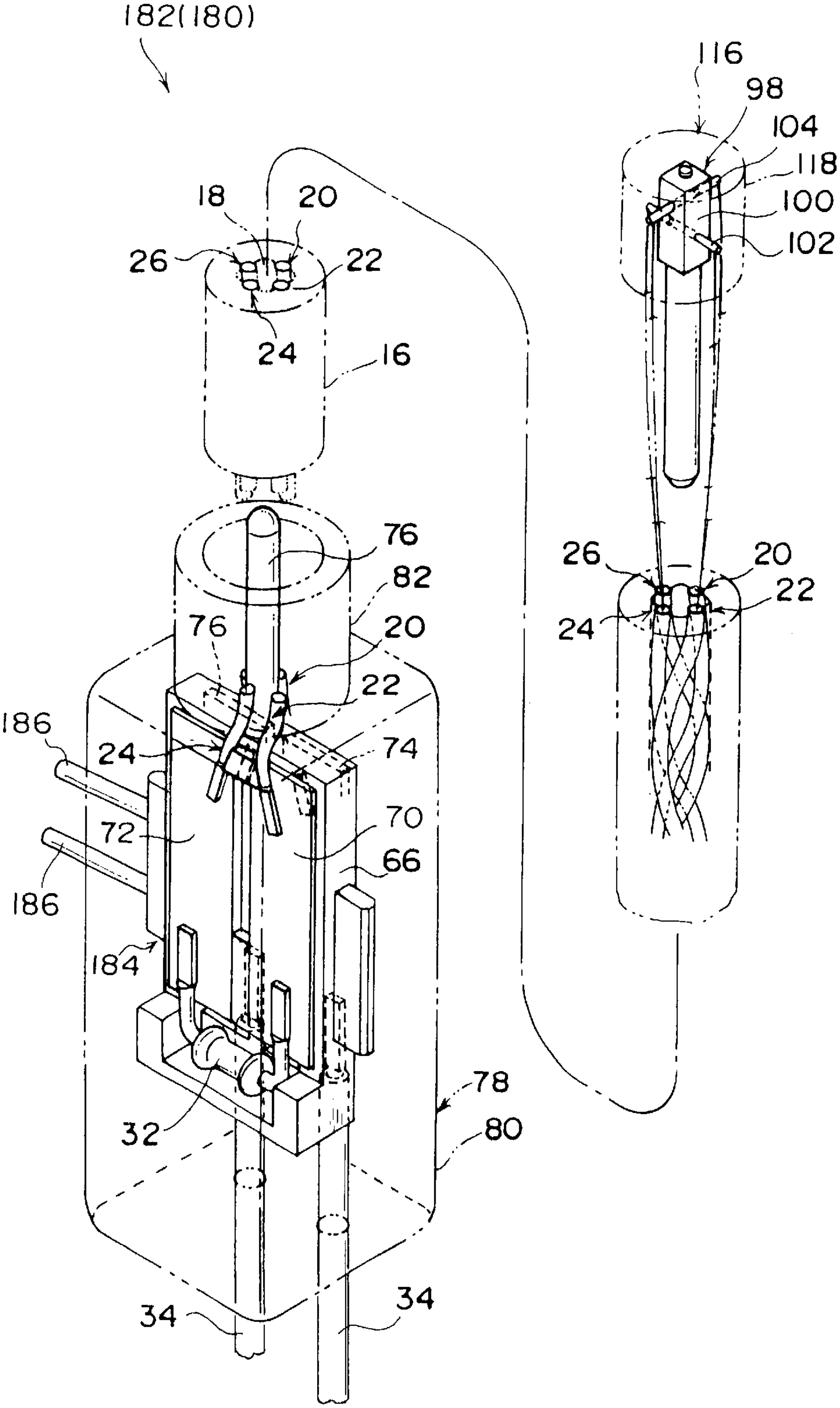
FIG. 18 is a perspective view in correspondence with FIG. 3 showing a constitution of an essential portion of a pressure sensitive sensor according to a fourth embodiment of the invention.

FIG. 18 shows a constitution of an essential portion of a pressure sensitive sensor 182 of a squeezing detecting apparatus 180 as a pressure detecting apparatus according to the present embodiment by a perspective view.

As shown by FIG. 18, the pressure sensitive sensor 182 is provided with a support member 184 in place of the support member 64. Although the support member 184 is provided with the constitution basically the same as that of the support member 64, the constitution differs from that of the support member 64 in that a pair of holding projections 186 as holding portions are formed to project from one end portion in the width direction of the base 66. As shown by FIG. 18, each of the holding projections 186 is formed by a shape substantially of a circular cylinder an outer diameter dimension of which is basically uniform substantially, further, a front end side thereof is projected from the covering portion 78.

Figure 19:
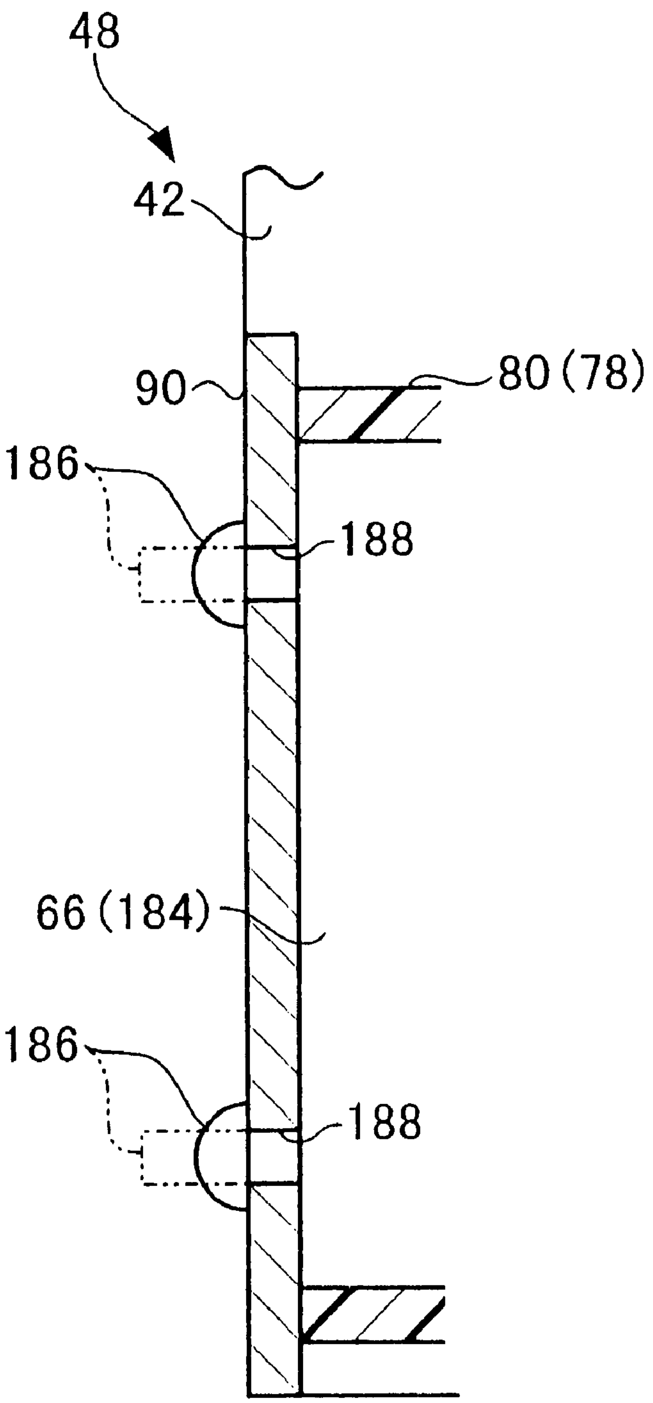
FIG. 19 is a sectional view of a cover of the pressure sensitive sensor according to the fourth embodiment of the invention.

As shown by FIG. 19, the cover 90 is formed with a pair of through holes 188 in place of the fitting holes 92 in correspondence with the holding projections 186. An inner diameter dimension of the through hole 188 is very slightly larger than an outer diameter dimension of the holding projection 186 and can be penetrated by the holding projection 186.

By calking the front end portion of the holding projection 186 by, for example, thermal calking in a state of penetrating the through hole 188, a draw preventive portion 190 whose outer diameter dimension is sufficiently larger than the inner diameter dimension of the through hole 188 is formed.

When the covering portion 78 is intended to displace relative to the cover 90 in a state of forming the draw preventive portion 190, in the direction of penetrating the through hole 188, the cover 90 interferes with an outer side face of the covering portion 78 or the draw preventive portion 190 and in a diameter direction of the through hole 188, an inner peripheral portion of the through hole 188 interferes with an outer peripheral portion of the holding projection 186. By restricting the displacement of the covering portion 78 relative to the cover 90 in this way, similar to the first embodiment, the outer skin portion 16 and the covering portion 78 are integrally connected via the bracket 48 and the protector 38. Therefore, also according to the embodiment, basically, operation similar to that of the first embodiment can be achieved and an effect similar thereto can be achieved.

Further, according to the embodiment, there is constructed a constitution in which the shape of the holding projection 186 is constituted substantially by the shape of a circular cylinder and the draw preventive portion 190 having the diameter larger that of the through hole 188 substantially in the circular shape is formed by thermal calking. However, the holding projection 186 may be provided with the shape capable of restricting the displacement of the covering portion 78 relative to the cover 90 by engaging with the through hold 188 and the shapes of the holding projection 186 and the through hold 188 are not limited to the above-described shape (circular cylinder shape or circular shape).

<Fifth Embodiment>

Next, a fifth embodiment of the invention will be explained.

Figure 20:
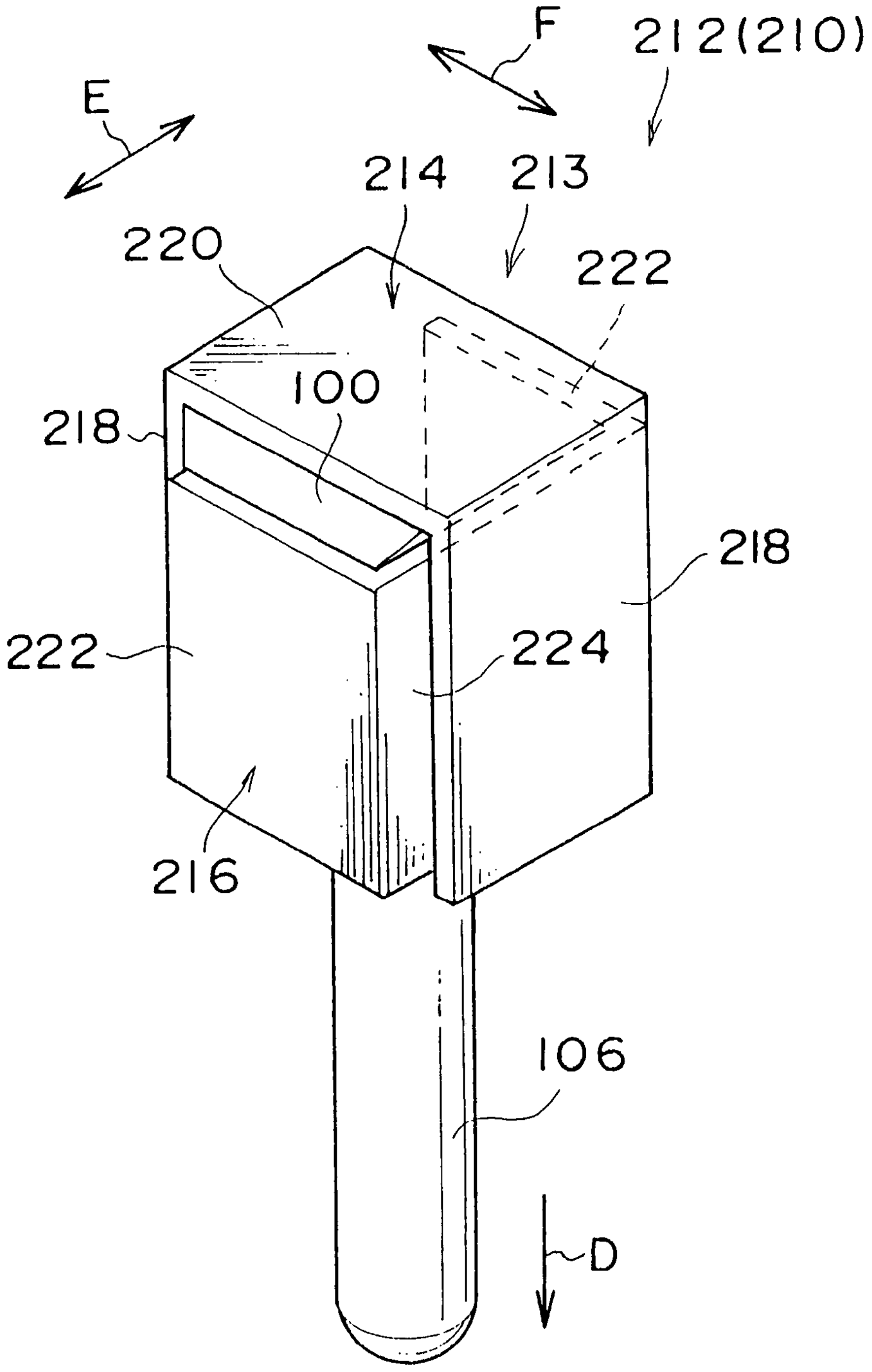
FIG. 20 is a perspective view showing a constitution of an essential portion of a pressure sensitive sensor according to a fifth embodiment of the invention.
Figure 21:
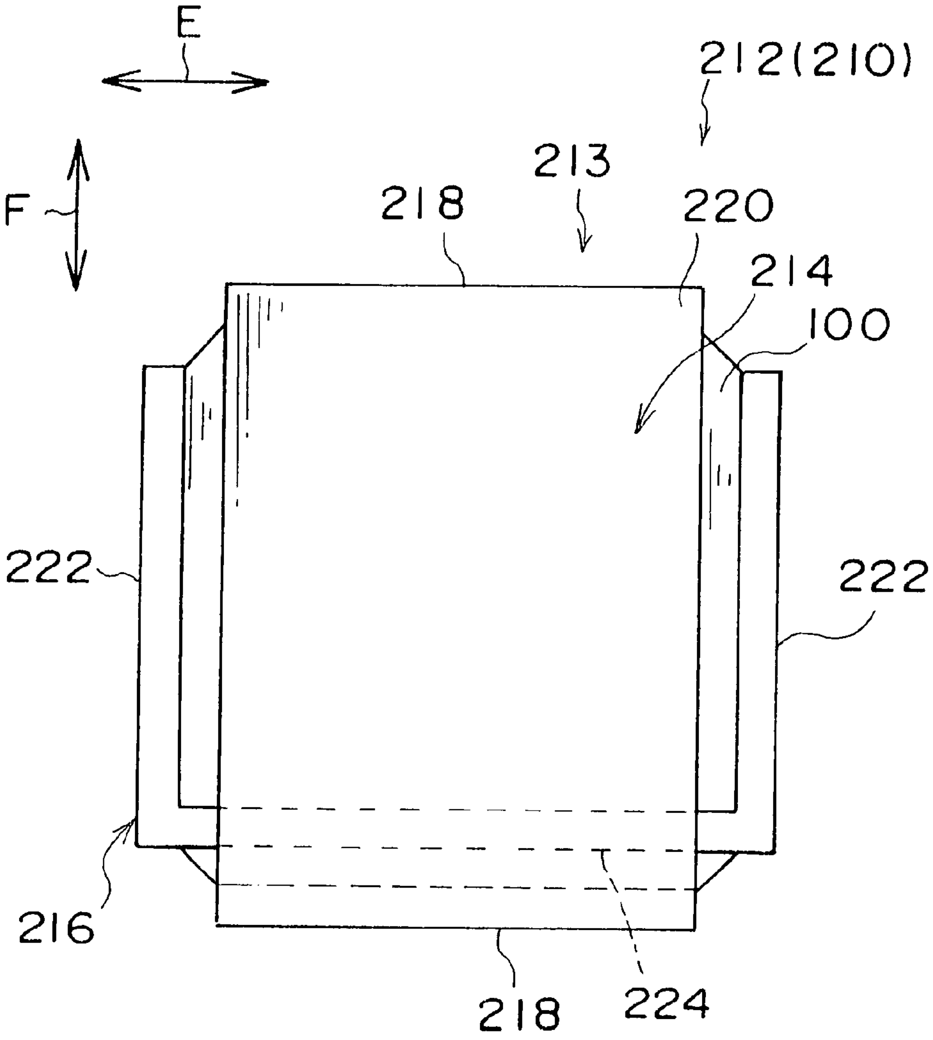
FIG. 21 is a plane view showing the constitution of the essential portion of the pressure sensitive sensor according to the fifth embodiment of the invention.

FIG. 20 shows a constitution of an essential portion of a pressure sensitive sensor 212 of a squeezing detecting apparatus 210 as a pressure detecting apparatus according to the present embodiment by a perspective view and FIG. 21 shows a plane view of the essential portion of the pressure sensitive sensor 212.

As shown by the drawings, the pressure sensitive sensor 212 is provided with a support member 184 as a terminal support member in place of the support member 98.

Although the support member 184 is the same as the support member 98 in that the support member 184 is formed by an insulating synthetic resin material and provided with the base 100 (insulating holding member) formed with the shaft 106, the support member 184 is not provided with the conductive shafts 102 and 104 or the conductive plates 110 and 112 as the connecting members and is provided with conductive pieces 214 and 216 as connecting members formed by a conductive material of a metal or the like in place thereof.

The conductive piece 214 is formed in a recessed shape opened to one side of the longitudinal direction (arrow mark D direction of FIG. 20, FIG. 21) of the base 100 in a side view (state viewed along arrow mark E direction of FIG. 20). Further, the conductive piece 214 is provided with a pair of terminal plates 218 opposed to each other along a thickness direction (arrow mark E direction of FIG. 20, FIG. 21) of the base 100.

The terminal plates 218 are formed such that a longitudinal direction and a thickness direction thereof are along the longitudinal direction and the thickness direction of the base 100. Further, other end portion of the electrode line 20 (not illustrated in FIGS. 20, 21) is fixedly attached to a face of one terminal plate 218 opposed to other terminal 218 in a conducted state and other end portion of the electrode lines 24 (not illustrated in FIGS. 20, 21) is fixedly attached to a face of the other terminal 218 on a side opposed to the one terminal plate 218 in a conducted state.

Further, end portions of the terminal plates 218 on other side in the longitudinal direction (direction opposed to arrow mark D of FIG. 20) which are not opposed to other end of the outer skin portion 16, are integrally connected by a connecting plate 220, thereby, the both terminal plates 218 are conducted to each other.

Meanwhile, the conductive piece 216 is formed in a recessed shape opened to one side in the thickness direction of the base 100 in a plane view (state illustrated by FIG. 21). Further, the conductive piece 216 is provided with a pair of terminal plates 222 opposed to each other along the width direction of the base 100.

The terminal plates 222 are formed such that a longitudinal direction and a thickness direction thereof are along the longitudinal direction and the width direction (arrow mark F direction of FIGS. 20, 21) of the base 100. Further, other end portion of the electrode line 22 is fixedly attached to a face of one terminal plate 222 on a side opposed to other terminal plate 222 in a conducted state and other end portion of the electrode line 26 is fixedly attached to a face of the other terminal 222 on a side opposed to the one terminal plate 222 in a conducted state.

Further, one-side ends in the width direction (arrow mark F direction of FIG. 20, FIG. 21) of the terminal plates 222 are integrally connected by a connecting plate 224 penetrating the base 100 between the above-described pair of terminal plates 218, thereby, the both terminal plates 222 are conducted to each other.

Further, the conductive piece 214 and the conductive piece 216 are integrally held by the base 100 and the conductive piece 214 and the conductive piece 216 are insulated from each other by interposing the base 100 between the conductive piece 214 and the conductive piece 216.

When other end portions in the longitudinal direction of the electrode lines 20 through 26 are treated (connected) by the pressure sensitive sensor 212, the corresponding electrode lines 20 and 24 are brought into contact with the respective terminal plates 218 of the conductive piece 214 in a state in which the shaft 106 is insertingly fitted from the other end portion of the outer skin portion 16. Under the state, a side of the electrode line 20 opposed to the terminal plate 218 and a side of the electrode line 24 opposed to the terminal plate 218 are interposed by the welding electrode and the ground electrode and welding current is made to flow. Thereby, a portion of the electrode line 20 in contact with the terminal plate 218 and a portion of the electrode line 24 in contact with the terminal plate 218 are melted by resistance heat. When the molten portions are cooled and solidified under the state, the electrode line 20 and the electrode line 24 are electrically conducted. Further, also the electrode lines 22 and 26 and the terminal plates 222 of the conductive piece 216 are similarly treated and the electrode line 22 and the electrode line 26 are electrically conducted.

In this case, welding is carried out in a state in which other end portions of the corresponding electrode lines 20 through 26 are brought into contact with one-side faces in the thickness direction of the terminal plates 218 and 222 and since the other end portions of the corresponding electrode lines 20 through 26 may be brought into contact with any portions of the faces of the terminal plates 218 and 222, welding is facilitated and automation of welding can be achieved.

Figure 22:
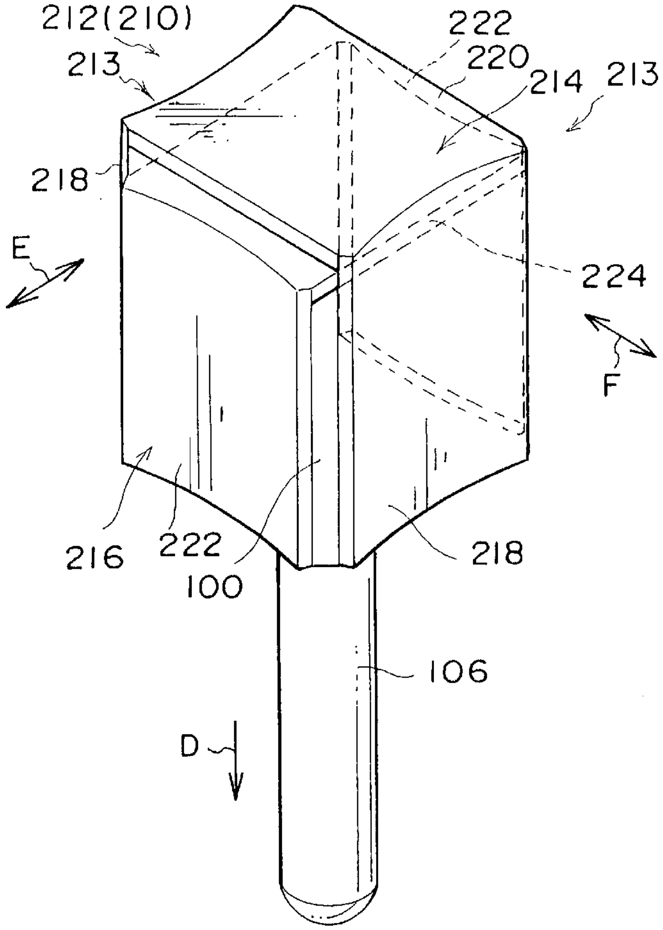
FIG. 22 is a perspective view in correspondence with FIG. 20 showing a modified example of the pressure sensitive sensor according to the fifth embodiment of the invention.
Figure 23:
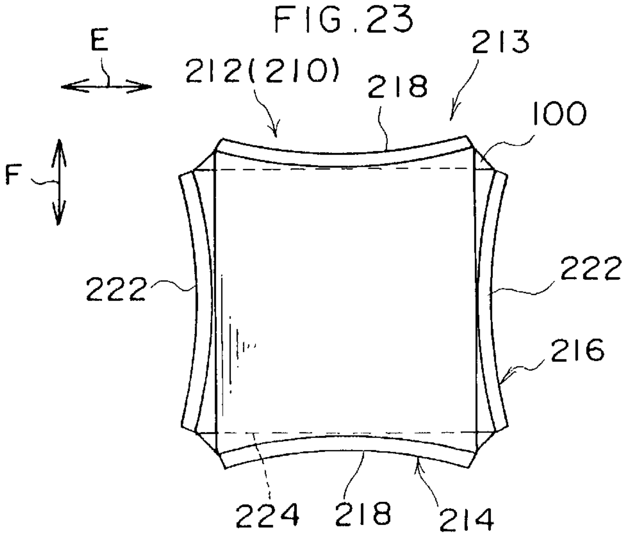
FIG. 23 is a perspective view in correspondence with FIG. 21 showing a modified example of the pressure sensitive sensor according to the fifth embodiment of the invention.

Further, although according to the embodiment, there is constructed a constitution in which one-side ends in the width direction of the terminal plates 222 are connected by the connecting plate 224, as shown by FIG. 22 and FIG. 23, one-side ends in the longitudinal direction of the terminal plates 222 may be connected by the connecting plate 224.

Further, as shown by FIG. 22 and FIG. 23, there may be constructed a constitution in which the pair of terminal plates 218 are bent in directions opposed to each other and the pair of terminal plates 222 are bent in directions opposed to each other. When the constitution is constructed, for example, in the case in which, for example, the electrode lines 20 through 26 are pushed to the terminal plates 218 and 222 to be interposed by the welding electrode and the ground electrode in the state in which the other end portions of the corresponding electrode lines 20 through 26 are brought into contact with the terminal plates 218 and 222, the electrode lines 20 through 26 can be interposed in a stable state and operability in connecting operation (welding operation) is promoted.

What is claimed is:

1. A pressure sensitive sensor comprising:

a hollow outer skin portion elastically deformable by an external force from outside and having an insulating performance;

a plurality of electrodes which are arranged to be opposed to each other via an air gap on an inner side of the outer skin portion and one-side ends of which are drawn out from an end portion of the outer skin portion;

a support member provided on a side of the end portion of the outer skin portion for supporting the one-side ends of the plurality of electrodes drawn out from the end portion of the outer skin portion and electrically connecting the plurality of electrodes to each other or the plurality of electrodes to other conductive member; and a covering portion formed by a material including at least either one of a thermoplastic resin material molded by hot melt molding and a photo-curing resin material cured by absorbing a light energy for sealing at least a portion of the support member and the one-sides of the electrodes in an embedded state.

2. The pressure sensitive sensor according to claim 1, wherein the end portion of the outer skin portion is embedded in the covering portion to seal.

3. The pressure sensitive sensor according to claim 1, wherein the covering portion comprising:

an inner layer formed by the thermoplastic resin material molded by the hot melt molding or the photo-curing resin material for sealing at least the portion of the support member and the one-side ends of the electrodes in the embedded state; and an outer layer formed by the thermoplastic resin material molded by the hot melt molding or the photo-curing resin material integrally with the inner layer for covering at least a portion of the inner layer from an outer side and having a rigidity higher than a rigidity of the inner layer in a cured state.

4. The pressure sensitive sensor according to claim 1, wherein the covering portion is made transparent or semi-transparent.

5. The pressure sensitive sensor according to claim 1, wherein the covering portion includes an engaging portion provided integrally therewith and the covering portion and the outer skin portion are integrally held via the engaging portion.

6. The pressure sensitive sensor according to claim 5, wherein the engaging portion is formed by a material the same as a material of the covering portion.

7. A method of treating a terminal of a pressure sensitive sensor which is a method of treating a terminal of a pressure sensitive sensor for treating the one-side ends of the plurality of electrodes drawn out from the end portion of the outer skin portion when the pressure sensitive sensor according to claim 1 is produced, said method comprising:

(a) a connecting step of making the support member support the one-side ends of the plurality of electrodes and electrically connecting the electrodes to each other or the electrodes to other conductive member;

(b) an inner layer molding step of forming an inner layer constituting the covering portion by arranging at least a portion of the support member and the one-side ends of the electrodes in an inner layer molding die and filling a photo-curing resin material cured by absorbing a light energy or a thermoplastic resin material molded by hot melt molding in the inner layer molding die so that at least the portion of the support member and the one-side ends of the electrodes are embedded in the inner layer to seal; and (c) an outer layer molding step of forming an outer layer constituting the covering portion by arranging at least a portion of the inner layer in an outer layer molding die and filling a photo-curing resin material cured by a rigidity higher than a rigidity of the inner layer by absorbing the light energy, or a thermoplastic resin material molded by the hot melt molding and having a rigidity higher than the rigidity of the inner layer in a cured state, in the outer layer molding die, so that at least the portion of the inner layer is covered by the outer layer.

8. The method of treating a terminal of a pressure sensitive sensor according to claim 7:

wherein in the (b) inner layer molding step, the end portion of the outer skin portion is arranged in the inner layer molding die.

9. The method of treating a terminal of a pressure sensitive sensor according to claim 7:

wherein at least either one of the (c) outer layer molding step and the (b) inner layer moldering step, further comprising:

(d) a step of forming an engaging portion integral with the covering portion; and (e) a step of holding the covering portion and the outer skin portion in air tight and integrally via the engaging portion.

10. A method of treating a terminal of a pressure sensitive sensor, the pressure sensitive sensor including: a hollow outer skin portion having insulating performance and deformable by an external force from outside; and a plurality of electrodes arranged to be opposed to each other via an air gap on an inner side of the hollow outer skin portion, the pressure sensitive sensor detecting an external force when at least one of the plurality of electrodes is elastically deformed together with the outer skin portion by the external force applied to the outer skin portion from outside and the deformed electrode is brought into contact with other of the plurality of electrodes, the method being for treating one-side ends of the plurality of electrodes drawn out from an end portion of the outer skin portion, said method comprising:

(a) a connecting step of making a support member support the one-side ends of the plurality of electrodes for electrically connecting the electrodes to each other or the electrodes to other conductive member; and (b) a covering portion molding step of forming a covering portion for embedding and sealing at least a portion of the support member and the one-side ends of the electrodes by arranging at least the portion of the support member and the one-sides of the electrodes in a covering portion molding die and filling a photo-curing resin material cured by absorbing a light energy or a thermoplastic resin material molded by hot melt molding in the covering portion molding die.

11. The method of treating a terminal of a pressure sensitive sensor according to claim 10:

wherein the (b) covering portion molding step comprising:

(c) an inner layer molding step of forming an inner layer constituting the covering portion by arranging at least the portion of the support member and the one-side ends of the electrodes in an inner layer molding die and filling a photo-curing resin material cured by absorbing a light energy or a thermoplastic resin material molded by hot melt molding in the inner layer molding die so that at least the portion of the support member and the one-side ends of the electrodes are embedded in the inner layer to seal; and (d) an outer layer molding step of forming an outer layer constituting the covering portion by arranging at least a portion of the inner layer in an outer layer molding die and filling a photo-curing resin material cured by a rigidity higher than a rigidity of the inner layer by absorbing the light energy, or a thermoplastic resin material molded by the hot melt molding and having a rigidity higher than the rigidity of the inner layer in a cured state in the outer layer molding die so that at least the portion of the inner layer is covered by the outer layer.

12. The method of treating a terminal of a pressure sensitive sensor according to claim 11, wherein the (c) inner layer molding step further includes the step of arranging an end portion of the outer skin portion in the inner layer molding die.

13. The method of treating a terminal of a pressure sensitive sensor according to claim 11, wherein at least either one of the (d) outer layer molding step and the (c) inner layer molding step, further comprising:

(e) a step of forming an engaging portion integral with the covering portion; and (f) a step of holding the covering portion and the outer skin portion in air tight and integrally via the engaging portion.

14. The pressure sensitive sensor according to claim 10, wherein the (b) covering portion forming step further comprising:

a step of making the covering portion transparent or semitransparent.

15. The pressure sensitive sensor according to claim 13:

wherein the (e) engaging portion molding step further comprising:

a step of forming the engaging portion by a material the same as a material of the covering portion.

* * * * *